United States Patent
Kobel et al.

(10) Patent No.: US 12,245,105 B2
(45) Date of Patent: Mar. 4, 2025

(54) EQUIPMENT IDENTIFICATION SYSTEM AND METHOD

(71) Applicant: Oshkosh Corporation, Oshkosh, WI (US)

(72) Inventors: Korry D. Kobel, Oshkosh, WI (US); Fredric L. Yutzy, Oshkosh, WI (US); Dan Adamson, Oshkosh, WI (US); Stefan Eshleman, Oshkosh, WI (US); Greg Pray, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/576,669

(22) Filed: Jan. 14, 2022

(65) Prior Publication Data

US 2022/0229523 A1    Jul. 21, 2022

Related U.S. Application Data

(60) Provisional application No. 63/138,016, filed on Jan. 15, 2021, provisional application No. 63/138,024, (Continued)

(51) Int. Cl.
*H04W 4/08* (2009.01)
*B66F 9/06* (2006.01)
(Continued)

(52) U.S. Cl.
CPC ............... *H04W 4/08* (2013.01); *B66F 9/06* (2013.01); *B66F 9/0755* (2013.01);
(Continued)

(58) Field of Classification Search
CPC ....... G06F 3/0482; G06F 3/0484; G08B 3/00; G08B 5/36; H04W 4/08
See application file for complete search history.

(56) References Cited

U.S. PATENT DOCUMENTS 3,009,747 A    11/1961    Pitzer
4,099,761 A    7/1978    Cullings
(Continued)

FOREIGN PATENT DOCUMENTS

CN    102756997 A    10/2012
CN    107426770 B    12/2017
(Continued)

OTHER PUBLICATIONS

"Teleoperation of Multiple Robots through the Internet", by Suzuki et al., IEEE International Workshop on Robot and Human Comunication, published 1996, pp. 84-89 (Year: 1996).*
(Continued)

*Primary Examiner* — William L Bashore
*Assistant Examiner* — Gregory A Distefano
(74) *Attorney, Agent, or Firm* — Foley & Lardner LLP

(57) ABSTRACT

An equipment identification system for identifying and operating one or more machines at a site. The system includes one or more connectivity modules, each connectivity module communicatively and physically coupled to one of the one or more machines. The system also includes a user device configured to communicate with the one or more connectivity modules via a network connection. In response to a user selection on an application hosted on the user device, one or more of the machines are identified by one or both of an audible signal or a visual signal.

16 Claims, 15 Drawing Sheets

Related U.S. Application Data filed on Jan. 15, 2021, provisional application No. 63/137,955, filed on Jan. 15, 2021, provisional application No. 63/137,950, filed on Jan. 15, 2021, provisional application No. 63/137,978, filed on Jan. 15, 2021, provisional application No. 63/137,893, filed on Jan. 15, 2021, provisional application No. 63/138,015, filed on Jan. 15, 2021, provisional application No. 63/137,867, filed on Jan. 15, 2021, provisional application No. 63/137,996, filed on Jan. 15, 2021, provisional application No. 63/138,003, filed on Jan. 15, 2021.

(51) Int. Cl.

| | | |
|---|---|---|
| *B66F 9/075* | (2006.01) | |
| *B66F 9/12* | (2006.01) | |
| *B66F 11/04* | (2006.01) | |
| *G05B 19/4155* | (2006.01) | |
| *G05D 1/00* | (2006.01) | |
| *G05D 1/224* | (2024.01) | |
| *G05D 1/225* | (2024.01) | |
| *G05D 1/226* | (2024.01) | |
| *G05D 1/692* | (2024.01) | |
| *G06F 3/0482* | (2013.01) | |
| *G06F 3/0484* | (2022.01) | |
| *G06F 3/0488* | (2022.01) | |
| *G06Q 10/20* | (2023.01) | |
| *G06Q 30/0251* | (2023.01) | |
| *G06Q 30/0601* | (2023.01) | |
| *G07C 5/00* | (2006.01) | |
| *G07C 5/08* | (2006.01) | |
| *G08B 3/00* | (2006.01) | |
| *G08B 5/36* | (2006.01) | |
| *G08B 7/06* | (2006.01) | |
| *G08B 21/18* | (2006.01) | |
| *H04L 67/52* | (2022.01) | |
| *H04L 67/63* | (2022.01) | |
| *H04W 4/029* | (2018.01) | |
| *H04W 4/30* | (2018.01) | |
| *H04W 4/40* | (2018.01) | |
| *H04W 4/70* | (2018.01) | |
| *H04W 8/00* | (2009.01) | |
| *H04W 48/16* | (2009.01) | |
| *H04W 76/14* | (2018.01) | |
| *H04W 76/15* | (2018.01) | |
| *H04W 76/23* | (2018.01) | |
| *B66F 17/00* | (2006.01) | |
| *G06F 16/93* | (2019.01) | |
| *H04W 4/35* | (2018.01) | |
| *H04W 4/80* | (2018.01) | |
| *H04W 84/12* | (2009.01) | |
| *H04W 84/18* | (2009.01) | |
| *H04W 88/08* | (2009.01) | |

(52) U.S. Cl.
CPC ............ *B66F 9/07581* (2013.01); *B66F 9/12* (2013.01); *B66F 11/046* (2013.01); *G05B 19/4155* (2013.01); *G05D 1/0022* (2013.01); *G05D 1/0027* (2013.01); *G05D 1/0044* (2013.01); *G05D 1/005* (2013.01); *G05D 1/224* (2024.01); *G05D 1/225* (2024.01); *G05D 1/226* (2024.01); *G05D 1/692* (2024.01); *G06F 3/0482* (2013.01); *G06F 3/0484* (2013.01); *G06F 3/0488* (2013.01); *G06Q 10/20* (2013.01); *G06Q 30/0251* (2013.01); *G06Q 30/0611* (2013.01); *G06Q 30/0631* (2013.01); *G06Q 30/0641* (2013.01); *G07C 5/006* (2013.01); *G07C 5/0825* (2013.01); *G08B 3/00* (2013.01); *G08B 5/36* (2013.01); *G08B 7/06* (2013.01); *G08B 21/18* (2013.01); *H04L 67/52* (2022.05); *H04L 67/63* (2022.05); *H04W 4/029* (2018.02); *H04W 4/30* (2018.02); *H04W 4/40* (2018.02); *H04W 4/70* (2018.02); *H04W 8/005* (2013.01); *H04W 48/16* (2013.01); *H04W 76/14* (2018.02); *H04W 76/15* (2018.02); *H04W 76/23* (2018.02); *B66F 11/04* (2013.01); *B66F 17/006* (2013.01); *G05B 2219/45049* (2013.01); *G06F 16/93* (2019.01); *H04W 4/35* (2018.02); *H04W 4/80* (2018.02); *H04W 84/12* (2013.01); *H04W 84/18* (2013.01); *H04W 88/08* (2013.01); *H04W 88/085* (2013.01)

(56) References Cited

U.S. PATENT DOCUMENTS

| | | |
|---|---|---|
| 4,178,591 A | 12/1979 | Geppert |
| 4,315,652 A | 2/1982 | Barwise |
| 4,426,110 A | 1/1984 | Mitchell et al. |
| 4,461,608 A | 7/1984 | Boda |
| 4,572,567 A | 2/1986 | Johnson |
| 4,573,728 A | 3/1986 | Johnson |
| 4,810,020 A | 3/1989 | Powell |
| 5,026,104 A | 6/1991 | Pickrell |
| 5,092,731 A | 3/1992 | Jones et al. |
| 5,209,537 A | 5/1993 | Smith et al. |
| 5,330,242 A | 7/1994 | Lucky, Sr. |
| 5,730,430 A | 3/1998 | Hodson et al. |
| 5,919,027 A | 7/1999 | Christenson |
| 5,934,858 A | 8/1999 | Christenson |
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,984,609 A | 11/1999 | Bartlett |
| 6,033,176 A | 3/2000 | Bartlett |
| 6,062,803 A | 5/2000 | Christenson |
| 6,089,813 A | 7/2000 | McNeilus et al. |
| 6,120,235 A | 9/2000 | Humphries et al. |
| 6,123,500 A | 9/2000 | McNeilus et al. |
| 6,210,094 B1 | 4/2001 | McNeilus et al. |
| 6,213,706 B1 | 4/2001 | Christenson |
| 6,224,318 B1 | 5/2001 | McNeilus et al. |
| 6,264,013 B1 | 7/2001 | Hodgins |
| 6,315,515 B1 | 11/2001 | Young et al. |
| 6,336,783 B1 | 1/2002 | Young et al. |
| 6,350,098 B1 | 2/2002 | Christenson et al. |
| 6,411,887 B1 * | 6/2002 | Martens ................. G08G 1/017 340/902 |
| 6,447,239 B2 | 9/2002 | Young et al. |
| 6,474,928 B1 | 11/2002 | Christenson |
| 6,526,335 B1 | 2/2003 | Treyz et al. |
| 6,565,305 B2 | 5/2003 | Schrafel |
| 7,070,382 B2 | 7/2006 | Pruteanu et al. |
| 7,207,610 B1 | 4/2007 | Kauppila |
| 7,284,943 B2 | 10/2007 | Pruteanu et al. |
| 7,556,468 B2 | 7/2009 | Grata |
| 7,559,735 B2 | 7/2009 | Pruteanu et al. |
| 7,721,857 B2 | 5/2010 | Harr |
| 7,878,750 B2 | 2/2011 | Zhou et al. |
| 7,934,758 B2 | 5/2011 | Stamey et al. |
| 8,182,194 B2 | 5/2012 | Pruteanu et al. |
| 8,215,892 B2 | 7/2012 | Calliari |
| 8,360,706 B2 | 1/2013 | Addleman et al. |
| 8,540,475 B2 | 9/2013 | Kuriakose et al. |
| 8,655,505 B2 | 2/2014 | Sprock et al. |
| 8,807,613 B2 | 8/2014 | Howell et al. |
| 8,833,823 B2 | 9/2014 | Price et al. |
| 9,028,193 B2 | 5/2015 | Goedken |
| 9,216,856 B2 | 12/2015 | Howell et al. |

(56) References Cited

U.S. PATENT DOCUMENTS

| | | |
|---|---|---|
| 9,387,985 B2 | 7/2016 | Gillmore et al. |
| 9,624,033 B1 | 4/2017 | Price et al. |
| 9,694,776 B2 | 7/2017 | Nelson et al. |
| 9,880,581 B2 | 1/2018 | Kuriakose et al. |
| 9,981,803 B2 | 5/2018 | Davis et al. |
| 10,018,171 B1 | 7/2018 | Breiner et al. |
| 10,035,648 B2 | 7/2018 | Haddick et al. |
| 10,196,205 B2 | 2/2019 | Betz et al. |
| 10,221,012 B2 | 3/2019 | Hund, Jr. |
| 10,457,533 B2 | 10/2019 | Puszkiewicz et al. |
| 10,796,577 B2 | 10/2020 | Katou et al. |
| 10,899,538 B2 | 1/2021 | Nelson et al. |
| 11,252,149 B1 | 2/2022 | Bang et al. |
| 11,948,019 B1 | 4/2024 | Singh et al. |
| 2002/0070862 A1 | 6/2002 | Francis et al. |
| 2002/0079713 A1 | 6/2002 | Moilanen et al. |
| 2002/0123345 A1 | 9/2002 | Mahany et al. |
| 2003/0158640 A1* | 8/2003 | Pillar .................. G01M 17/00 701/29.4 |
| 2005/0140154 A1 | 6/2005 | Vigholm et al. |
| 2005/0149920 A1 | 7/2005 | Patrizi et al. |
| 2007/0130296 A1 | 6/2007 | Kim |
| 2007/0213869 A1 | 9/2007 | Bandringa et al. |
| 2009/0005928 A1 | 1/2009 | Sells et al. |
| 2009/0049441 A1 | 2/2009 | Mii et al. |
| 2009/0088924 A1 | 4/2009 | Coffee et al. |
| 2009/0099897 A1 | 4/2009 | Ehrman et al. |
| 2009/0101447 A1 | 4/2009 | Durham et al. |
| 2010/0179844 A1 | 7/2010 | Lafergola et al. |
| 2011/0040440 A1 | 2/2011 | De Oliveira et al. |
| 2011/0081193 A1 | 4/2011 | Nilsson |
| 2012/0046809 A1 | 2/2012 | Wellman |
| 2013/0057007 A1 | 3/2013 | Howell et al. |
| 2013/0127611 A1 | 5/2013 | Bernstein et al. |
| 2013/0132140 A1* | 5/2013 | Amin ................. G06Q 30/0284 705/7.13 |
| 2013/0240300 A1 | 9/2013 | Fagan et al. |
| 2014/0241332 A1 | 8/2014 | Yang et al. |
| 2014/0278621 A1 | 9/2014 | Medwin et al. |
| 2014/0312639 A1 | 10/2014 | Petronek |
| 2015/0185716 A1 | 7/2015 | Wichmann et al. |
| 2015/0310674 A1 | 10/2015 | Humphrey et al. |
| 2015/0376869 A1 | 12/2015 | Jackson |
| 2016/0052762 A1 | 2/2016 | Swift |
| 2016/0121490 A1 | 5/2016 | Ottersland |
| 2016/0208992 A1 | 7/2016 | Parsons |
| 2016/0221816 A1 | 8/2016 | Pollock et al. |
| 2016/0272471 A1 | 9/2016 | Jaipaul |
| 2016/0304051 A1 | 10/2016 | Archer et al. |
| 2016/0318438 A1 | 11/2016 | Wadell |
| 2016/0371433 A1 | 12/2016 | Polesskiy et al. |
| 2017/0149901 A1 | 5/2017 | Condeixa et al. |
| 2017/0167088 A1 | 6/2017 | Walker et al. |
| 2017/0169631 A1 | 6/2017 | Walker et al. |
| 2017/0269608 A1 | 9/2017 | Chandrasekar et al. |
| 2017/0291805 A1 | 10/2017 | Hao et al. |
| 2017/0301210 A1 | 10/2017 | King et al. |
| 2018/0065544 A1 | 3/2018 | Brusco |
| 2018/0143734 A1 | 5/2018 | Ochenas et al. |
| 2018/0150885 A1 | 5/2018 | Albinger et al. |
| 2018/0151037 A1 | 5/2018 | Morgenthau et al. |
| 2018/0234266 A1 | 8/2018 | Rudolph et al. |
| 2018/0335903 A1 | 11/2018 | Coffman et al. |
| 2019/0033172 A1 | 1/2019 | Montemurro et al. |
| 2019/0156394 A1 | 5/2019 | Karmakar |
| 2019/0180354 A1 | 6/2019 | Greenberger et al. |
| 2019/0246060 A1 | 8/2019 | Tanabe et al. |
| 2019/0376459 A1 | 12/2019 | Pieczko et al. |
| 2020/0014759 A1 | 1/2020 | Wunderlich |
| 2020/0065433 A1 | 2/2020 | Duff et al. |
| 2020/0134955 A1 | 4/2020 | Kishita |
| 2020/0183362 A1 | 6/2020 | Ledwith et al. |
| 2020/0207166 A1 | 7/2020 | Froehlich |
| 2020/0317489 A1 | 10/2020 | Bhatia et al. |
| 2021/0023985 A1* | 1/2021 | Stadnyk .................. B60Q 1/52 |
| 2021/0055178 A1 | 2/2021 | Hinderling et al. |
| 2021/0056771 A1 | 2/2021 | Federle |
| 2021/0087035 A1 | 3/2021 | Yip et al. |
| 2021/0211852 A1 | 7/2021 | Ramalho De Oliveira et al. |
| 2021/0232137 A1* | 7/2021 | Whitfield, Jr. ....... G05D 1/0027 |
| 2021/0250178 A1* | 8/2021 | Herman .................. H04L 9/32 |
| 2022/0035364 A1 | 2/2022 | Laclef et al. |
| 2022/0156921 A1 | 5/2022 | Humpston et al. |
| 2022/0221365 A1 | 7/2022 | Mahurkar et al. |
| 2022/0229415 A1 | 7/2022 | Kobel et al. |
| 2022/0229431 A1 | 7/2022 | Kobel et al. |
| 2022/0230224 A1 | 7/2022 | Kobel et al. |
| 2022/0230488 A1 | 7/2022 | Kobel et al. |
| 2022/0232649 A1 | 7/2022 | Kobel et al. |
| 2023/0224680 A1 | 7/2023 | Kobel et al. |
| 2023/0247390 A1 | 8/2023 | Kobel et al. |
| 2024/0073651 A1 | 2/2024 | Kobel et al. |
| 2024/0089708 A1 | 3/2024 | Kobel et al. |

FOREIGN PATENT DOCUMENTS

| | | |
|---|---|---|
| CN | 207608281 U | 7/2018 |
| CN | 111126522 A | 5/2020 |
| DE | 10 2007 020 182 A1 | 10/2008 |
| EP | 1 136 433 A2 | 9/2001 |
| EP | 2 886 507 A1 | 6/2015 |
| EP | 3 112 312 A1 | 1/2017 |
| EP | 3 173 369 A1 | 5/2017 |
| EP | 3 200 482 A1 | 8/2017 |
| EP | 3 896 024 A1 | 10/2021 |
| JP | H08-282995 A | 10/1996 |
| JP | H1059698 A | 3/1998 |
| JP | 2016-159996 A | 9/2016 |
| JP | 2020-128270 A | 8/2020 |
| JP | 2021-052920 A | 4/2021 |
| WO | WO-01/30671 A2 | 5/2001 |
| WO | WO-2011/019872 A2 | 2/2011 |
| WO | WO-2012/109444 A2 | 8/2012 |
| WO | WO-2020/121613 A1 | 6/2020 |

OTHER PUBLICATIONS

International Search Report and Written Opinion issued in connection with PCT Appl. Ser. No. PCT/US2022/012610 dated Jun. 21, 2022 (19 pages).

Invitation to Pay Additional Fees issued in connection with PCT Appl. Ser. No. PCT/US2022/012610 dated Apr. 28, 2022 (136 pages).

Invitation to Pay Additional Fees issued in connection with PCT Appl. Ser. No. PCT/US2022/012628 dated May 13, 2022 (134 pages).

Notification of Transmittal of the International Search Report and the Written Opinion of the International Search Authority, or the Declaration issued in connection with PCT Appl. Ser. No. PCT/US2022/012603 dated Jul. 6, 2022 (27 pages).

Notification of Transmittal of the International Search Report and the Written Opinion of the International Search Authority, or the Declaration issued in connection with PCT Appl. Ser. No. PCT/US2022/012628 dated Jul. 6, 2022 (27 pages).

* cited by examiner

EQUIPMENT IDENTIFICATION SYSTEM AND METHOD

CROSS-REFERENCE TO RELATED PATENT APPLICATIONS

This application claims the benefit of and priority to U.S. Provisional Application No. 63/137,950, filed on Jan. 15, 2021, U.S. Provisional Application No. 63/137,955, filed on Jan. 15, 2021, U.S. Provisional Application No. 63/137,996, filed on Jan. 15, 2021, U.S. Provisional Application No. 63/138,003, filed on Jan. 15, 2021, U.S. Provisional Application No. 63/138,015, filed on Jan. 15, 2021, U.S. Provisional Application No. 63/138,016, filed on Jan. 15, 2021, U.S. Provisional Application No. 63/138,024, filed on Jan. 15, 2021, U.S. Provisional Application No. 63/137,867, filed on Jan. 15, 2021, U.S. Provisional Application No. 63/137,893, filed on Jan. 15, 2021, and U.S. Provisional Application No. 63/137,978, filed on Jan. 15, 2021, all of which are hereby incorporated by reference herein.

BACKGROUND

Work equipment such as lifts and telehandlers sometimes require identifying, tracking, tasking, monitoring, and servicing at a work site. Managers and operators of working machines typically rely on discrete systems, applications, and methods to perform these functions for each piece of equipment.

SUMMARY OF THE INVENTION

One exemplary embodiment of the present disclosure relates to an equipment identification system for identifying one or more machines at a site. The system includes one or more connectivity modules, each connectivity module communicatively and physically coupled to one of the one or more machines and a user device configured to communicate with the one or more connectivity modules via a network connection. In response to a user selection on an application hosted on the user device, one or more of the machines are identified by one or both of an audible signal or a visual signal.

In some aspects of the system each connectivity module is a self-contained unit. In some aspects each connectivity module comprises a beacon, the beacon comprising one or both of a light or sound generator, wherein the beacon is configured to identify the associated machine by generating one or both of the audible signal or the visual signal. In some aspects, the beacon is configured to indicate a status or condition of the associated machine. In some aspects, the status or condition comprises one or more of a fuel level, a battery level, an ignition on/off condition, and a condition of movement. In some aspects, the user device is configured to selectively command the beacons of one or more machines within a selected range of the user device to indicate the status or condition of the associated machine. In some aspects, the user device is configured to send a command to the connectivity module of a machine to power up or power down the machine. In some aspects, the user device is configured to send a command to the connectivity module of a machine that enables or disables operation of the machine. In some aspects, the one or more connectivity modules are each communicatively coupled to a horn of a respective machine and wherein the connectivity module is configured to instruct the horn to generate the audible signal. In some aspects, the one or more connectivity modules are each communicatively coupled to one or more lights of a respective machine and wherein the connectivity module is configured to instruct the one or more lights to generate the visual signal.

Another exemplary embodiment of the present disclosure relates to an equipment identification system for identifying one or more machines at a site. The system includes one or more processing circuits comprising one or more memory devices coupled to one or more processors. The one or more memory devices are configured to store instructions thereon that, when executed by the one or more processors, cause the one or more processors to: communicate across a wireless network by sending messages to one or more machines and a user device each communicatively connected to the network; generate a graphical user interface (GUI) comprising a list of the one or more machines; send the GUI to a screen of the user device; receive, via the GUI, an indication of a selection of a machine from the list; and send, in response to receiving the indication of a selection of a machine, a message instructing the selected machine to generate one or both of a visual indication or an audible indication.

In some aspects of the system, the instructions further cause the one or more processors to receive, via the GUI, an indication of a selection of a status or condition of the selected machine and send, in response to receiving the selection of the status or condition, a message instructing the selected machine to indicate the selected status or condition of the selected machine using one or both of a visual indicator or an audible indicator. In some aspects the status or condition comprises one or more of a fuel level, a battery level, an ignition on/off condition, and a condition of movement. In some aspects, the instructions further cause the one or more processors to receive, via the GUI, an indication of a selection of an option to power up or power down the selected machine and send, (i) in response to receiving the indication of the selection of the option to power up the selected machine, a message instructing to the selected machine to power up the machine or, (ii) in response to receiving the indication of the selection of the option to power down the selected machine, a message instructing to the selected machine to power down the machine. In some aspects the instructions further cause the one or more processors to receive, via the GUI, an indication of a selection of an option to enable or disable operation of the selected machine and send, (i) in response to receiving the indication of the selection of the option to enable operation of the selected machine, a message instructing the selected machine to enable operation of the selected machine or, (ii) in response to receiving the indication of the selection of the option to disable operation of the selected machine, a message instructing to the selected machine to disable operation of the selected machine.

Another exemplary embodiment of the present disclosure relates to method of identifying a machine. The method includes generating a graphical user interface (GUI) comprising a list of the one or more machines; sending the GUI to a screen of a user device; receiving, via the GUI, an indication of a selection of a machine from the list; and sending, in response to receiving the indication of a selection of a machine, an instruction to the selected machine to generate one or both of a visual indication or an audible indication.

In some aspects, the method includes receiving, via the GUI, an indication of a selection of a status or condition of the selected machine and sending, in response to receiving the selection of the status or condition, an instruction to the selected machine to indicate the selected status or condition of the selected machine using one or both of a visual indicator or an audible indicator. In some aspects of the method, the status or condition comprises one or more of a fuel level, a battery level, an ignition on/off condition, and a condition of movement. In some aspects, the method includes receiving, via the GUI, an indication of a selection of an option to power up or power down the selected machine and sending, (i) in response to receiving the indication of the selection of the option to power up the selected machine, an instruction to the selected machine to power up the machine or, (ii) in response to receiving the indication of the selection of the option to power down the selected machine, a command to the selected machine to power down the machine. In some aspects, the method includes receiving, via the GUI, an indication of a selection of an option to enable or disable operation of the selected machine and sending, (i) in response to receiving the indication of the selection of the option to enable operation of the selected machine, an instruction to the selected machine to enable operation of the selected machine or, (ii) in response to receiving the indication of the selection of the option to disable operation of the selected machine, an instruction to the selected machine to disable operation of the selected machine.

One exemplary implementation of the present disclosure relates to an equipment identification system for identifying and operating particular machines at a site. The equipment identification system may identify one or more machines at a site through visual or audible indications. The equipment identification system may include one or more connectivity modules with each module communicably connected to a machine. In some embodiments, the connectivity module may be a self-contained unit. The connectivity module includes a beacon device with a light or a sound generator or a combination of both. In some examples, the connectivity module may be connected to the lights (e.g. headlights) and horn of a work machine. The equipment identification system may, for example, transmit instructions to the connectivity module to illuminate a light on a machine when a user presses a button on an application hosted on a mobile user device (e.g. an "identify my machine" application). Additionally, the machines horn can sound to provide audible alerts. The visual and audible alerts can be used in conjunction or independently of one another.

In some embodiments, the equipment identification system may generate a graphic display of a machine population. In some embodiments, the equipment identification system graphic display may comprise a map of the machine population. In some embodiments, the graphic display of the machine population may be generated using one or more selectable dynamic filters. The one or more selectable dynamic filters may be applied to identify a particular machine population or sub-population at one or more work sites. The one or more selectable dynamic filter may perform filtering according to one or more selectable attributes. The one or more selectable attributes may comprise, for example, a machine type, a machine model number, a machine manufacturer, a machine location, a machine work site tag, a machine status, a fuel status, a use status, etc. In some embodiments, the equipment identification system graphic display may be presented to a local user via a work site network. In some embodiments, the equipment identification system graphic display may be presented to a remote user via one or more communications networks. In some instances, the remote user may remotely apply desired filters or configuration setting to the equipment identification system graphic display presented to a local user on a local user interface device. In some embodiments, the equipment identification system graphic display filters or configuration setting may generate a one or more displays of the status or condition of work machines within a population of work machines in a combined view or in separate views.

In some embodiments, equipment identification system connectivity module beacon device may indicate a status or condition of a work machine. The status or condition of a work machine may include, for example, a fuel level, an ignition on/off condition, and a condition of movement. In some embodiments, the beacon device may be selectively commanded to indicate a particular status or condition of work machines within a population of work machines for work machines that are within a selected range of a user device.

In some embodiments, the status or condition of particular work machines at a work site indicated by the beacon device may be selected independent of or in conjunction with one or more filter criteria that a user applies to a population of sub-population of work machines within the equipment identification system.

In some embodiments, the equipment identification system may enable a user to transmit a command to a particular work machine to power up or power down.

In some embodiments, the equipment identification system may enable a user to transmit a "find me" command to a work machine to activate a "find me" indication. The "find me" indication may comprise, for example, a visual or an audible indication. The "find me" visual indication may comprise, for example, illumination of a work machine light or a beacon device light. The "find me" audible indication may comprise, for example, activation of a work machine horn or beacon device sound generator.

The equipment identification system includes one or more processing circuits comprising one or more memory devices coupled to one or more processors, the one or more memory devices configured to store instructions thereon that, when executed by the one or more processors, cause the one or more processors to: communicate across a wireless network by sending messages across nodes that are created by different machines and extend a connection with one nearby machine to a network of machines to connect to various machines across a work site. The equipment identification system then automatically identifies equipment connected to the network of machines. In some embodiments, the equipment identification system may be supported by an ad hoc machine to machine network. In some embodiments, the equipment identification system may be supported by a self-organizing network on a work site. In some embodiments, the communications means between machines connected to the network of machines may comprise wired networking, short range radio frequency networking (e.g. Bluetooth, Bluetooth Low Energy, Wi-Fi, VHF, or UHF), optical communications networking, or long range radio frequency networking (e.g. satellite communications). In some embodiments, the network of machines may be a mesh network. In some embodiments, access to machine-specific data from machines connected to the network of machines may be associated with one or more codes (e.g. a customer key). In some embodiments, the one or more codes may be associated with a fleet of equipment. In some embodiments, machine specific data may be accessed via the network for a machine connected to the local fleet connectivity system where the machine is associated with a specific code (e.g. customer key). In some embodiments, machine specific data for a plurality of machines connected to the network of machines may be accessed via the network using a customer account. In some embodiments, machine specific data for all of the machines connected to the local fleet connectivity system may be accessed via the network using a manufacturer account. In some embodiments, one or more messages may be generated in response to the state of a machine connected to the network of machines. In some embodiments, a change in the state of a machine connected to the network of machines may trigger the transmission of the one or more messages. In some instances, the one or more messages may be transmitted to a particular machine based on the code (e.g. customer key) associated with the machine. In some instances, the one or more messages transmitted to a particular machine based on the code (e.g. customer key) associated with the machine may be presented to a user via a user interface. In some embodiments, the one or more messages may comprise advertising, warnings, advisories, instructions, or reports. In some instances, the security of the network of machines is protected using the code (e.g. customer key) to restrict network access. In some instances, the confidentiality of data associated with machines connected to the local fleet connectivity system is protected using the code (e.g. customer key) to restrict network access. In some embodiments, the equipment identification system automatically associates machines connected on a near network to one or more other machines. In some embodiments, the automatic associations are based on rule stored on a work machine or on another network node. In some embodiments, the association rules are based on one or more of a work site designation, a location of a machine, a code (e.g. a customer key, a manufacturer key, or a maintainer key), etc. In some embodiments, assets (e.g. work machines) may automatically create or join a mesh network created by and among the assets themselves. In some instances, the mesh network corresponds to work site network. In some embodiments, a network identifier is automatically created upon creation of the work site network. In some embodiments, a user can designate or create the work site network. After joining the network, the machine may provide an indication that it is connected to the work site network. When the machine changes or enters a particular state or status (e.g. tow mode, transport mode, disconnection from a network, etc.), the machine may provide an indication that it has changed state or status (i.e. left the work site). In some embodiments, the equipment identification system may identify work machines based on type, owners, or manufacturers. In some embodiments, the equipment identification system may transmit data related to identify of a work machine to the cloud via the local fleet connectivity system for data processing or fleet management. In some embodiments, the equipment identification system generates an integrated work site group user interface that identifies and provide data for all equipment associated with a work site. In some embodiments, work machine data in the equipment identification system may be accessed based on a code (e.g. a customer key, a manufacturer key). In some instances, notifications related to work equipment identify may be generated based on a code (e.g. a customer key, a manufacturer key).

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
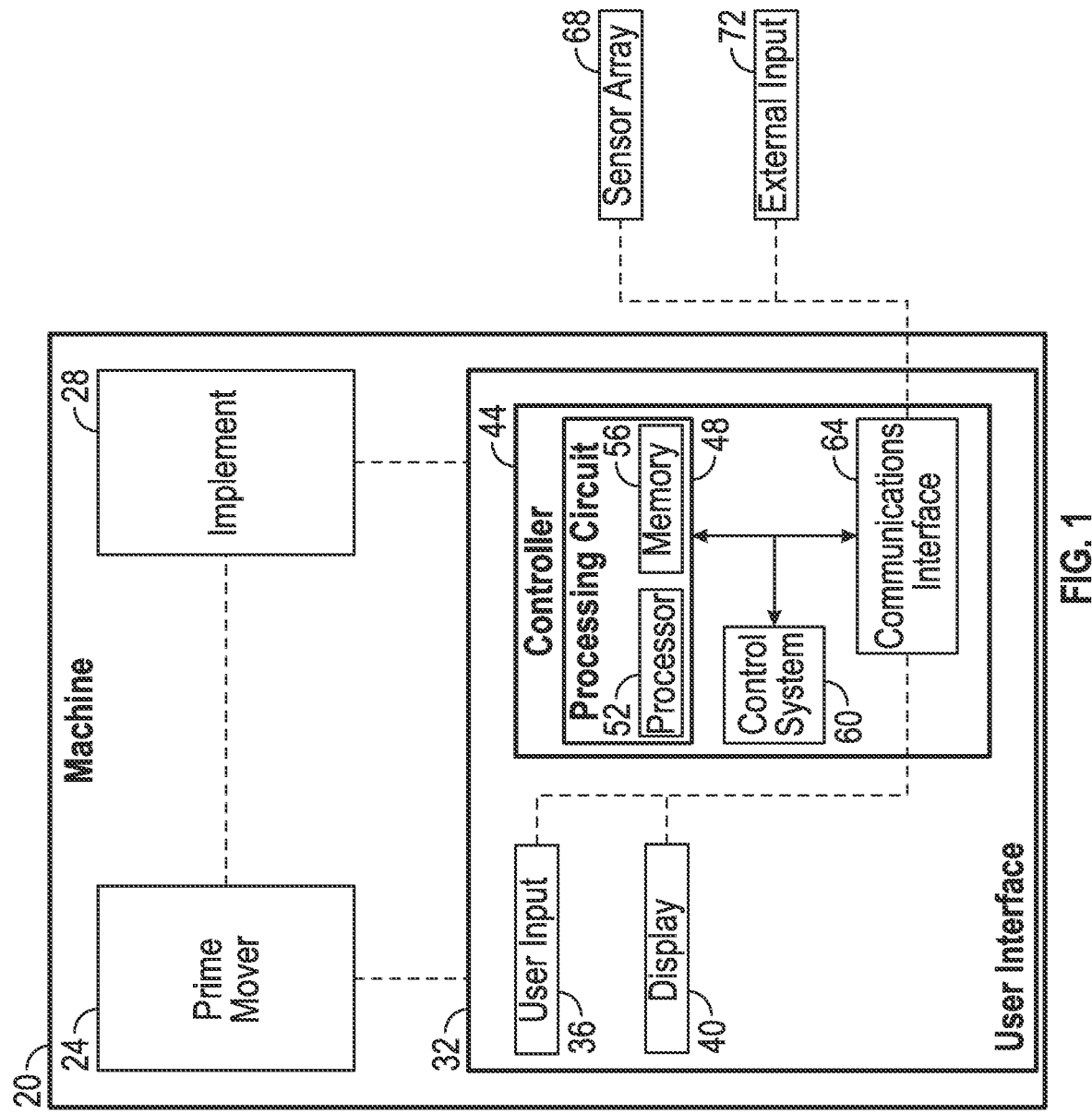
FIG. 1 is a schematic representation of a work machine including a machine control module according to some embodiments.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

On work sites encompassing a large area or involving many pieces of equipment, it is often difficult for equipment operators or service technicians to locate a particular piece of equipment to which they are assigned. It is therefore desirable to provide a means to quickly and effectively identify a particular machine or machines to a user thereby saving time, improving efficiency, and reducing costs.

Referring to the figures generally, various exemplary embodiments disclosed herein relate to systems and methods for an equipment identification system. For example, a system is configured to send instructions to work machine connectivity modules to illuminate a light or generate a sound, either with a beacon integrated into the connectivity module or with the lights and horn of the machine itself, responsive to a user interaction with an application (e.g. an "identify my machine" application). The equipment identification system assists users in locating a machine from among a group of machines on a work site through remote activation of visible and audible indicators on the machine (e.g. users enter commands on the "identify my machine" application to activate a beacon on a particular machine to distinguish it from a group of physically similar machines on a work site). Additionally, a work machine's lights and horn may be activated by the equipment identification system. In a further example, a beacon may be provided as a component of the equipment identification system. In another example, the equipment identification system may generate a user interface with a dynamic filter of a map to illustrate a total machine population. The user interface may also enable a remote user to apply such a filter to a specific jobsite network much the same as can be done locally via the mobile app. (in the instance where a remote user can apply the desired user configurable rules to assist a local user w/o the need of mobile app use). The equipment identification system may interoperate with a local fleet connectivity system that employs, for example, Bluetooth Low Energy (BLE) Machine to Machine (M2M) communication protocols to expand communication at a work site/jobsite between connected machines.

The figures also refer generally to the various exemplary embodiments disclosed herein relate to systems, apparatuses, and methods for a local fleet connectivity system. In some embodiments, the local fleet connectivity system can include work machines, interface modules, work site equipment, communications devices, communications networks, user interface devices, devices hosting self-forming network software, equipment users, equipment maintainers, and equipment suppliers. The information provided to the local fleet connectivity system can be communicated to a machine operator via a user interface. In some embodiments, the user interface includes a real time map, showing a current machine location, a machine status. In some embodiments, the user interface includes a color coded warning indicator, an audible alarm, or another indicator structured to communicate to the machine operator that the work machine is in a location or state that requires the attention of the operator.

As shown in FIG. 1, a work machine 20 (e.g., a telehandler, a boom lift, a scissor lift, etc.) includes a prime mover 24 (e.g., a spark ignition engine, a compression ignition engine, an electric motor, a generator set, a hybrid system, etc.) structured to supply power to the work machine 20, and an implement 28 driven by prime mover 24. In some embodiments, the implement 28 is a lift boom, a scissor lift, a telehandler arm, etc.

A user interface 32 is arranged in communication with the prime mover 24 and the implement 28 to control operations of the work machine 20 and includes a user input 36 that allows a machine operator to interact with the user interface 32, a display 40 for communicating to the machine operator (e.g., a display screen, a lamp or light, an audio device, a dial, or another display or output device), and a control module 44.

As the components of FIG. 1 are shown to be embodied in the work machine 20, the controller 44 may be structured as one or more electronic control units (ECU). The controller 44 may be separate from or included with at least one of an implement control unit, an exhaust after-treatment control unit, a powertrain control module, an engine control module, etc. In some embodiments, the control module 44 includes a processing circuit 48 having a processor 52 and a memory device 56, a control system 60, and a communications interface 64. Generally, the control module 44 is structured to receive inputs and generate outputs for or from a sensor array 68 and external inputs or outputs 72 (e.g. a load map, a machine-to-machine communication, a fleet management system, a user interface, a network, etc.) via the communications interface 64.

The control system 60 generates a range of inputs, outputs, and user interfaces. The inputs, outputs, and user interfaces may be related to a jobsite, a status of a piece of equipment, environmental conditions, equipment telematics, an equipment location, task instructions, sensor data, equipment consumables data (e.g. a fuel level, a condition of a battery), status, location, or sensor data from another connected piece of equipment, communications link availability and status, hazard information, positions of objects relative to a piece of equipment, device configuration data, part tracking data, text and graphic messages, weather alerts, equipment operation, maintenance, and service data, equipment beacon commands, tracking data, performance data, cost data, operating and idle time data, remote operation commands, reprogramming and reconfiguration data and commands, self-test commands and data, software as a service data and commands, advertising information, access control commands and data, onboard literature, machine software revision data, fleet management commands and data, logistics data, equipment inspection data including inspection of another piece of equipment using onboard sensors, prioritization of communication link use, predictive maintenance data, tagged consumable data, remote fault detection data, machine synchronization commands and data including cooperative operation of machines, equipment data bus information, operator notification data, work machine twinning displays, commands, and data, etc.

The sensor array 68 can include physical and virtual sensors for determining work machine states, work machine conditions, work machine locations, loads, and location devices. In some embodiments, the sensor array includes a GPS device, a LIDAR location device, inertial navigation, or other sensors structured to determine a position of the equipment 20 relative to locations, maps, other equipment, objects or other reference points.

In one configuration, the control system 60 is embodied as machine or computer-readable media that is executable by a processor, such as processor 52. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the control system 60 is embodied as hardware units, such as electronic control units. As such, the control system 60 may be embodied as one or more circuitry components including, but not limited to, processing circuitry, network interfaces, peripheral devices, input devices, output devices, sensors, etc. In some embodiments, the control system 60 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the control system 60 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The control system 60 may also include programmable hardware devices such as field programmable gate arrays, programmable array logic, programmable logic devices or the like. The control system 60 may include one or more memory devices for storing instructions that are executable by the processor(s) of the control system 60. The one or more memory devices and processor(s) may have the same definition as provided below with respect to the memory device 56 and processor 52. In some hardware unit configurations, the control system 60 may be geographically dispersed throughout separate locations in the machine. Alternatively, and as shown, the control system 60 may be embodied in or within a single unit/housing, which is shown as the controller 44.

In the example shown, the control module 44 includes the processing circuit 48 having the processor 52 and the memory device 56. The processing circuit 48 may be structured or configured to execute or implement the instructions, commands, and/or control processes described herein with respect to control system 60. The depicted configuration represents the control system 60 as machine or computer-readable media. However, as mentioned above, this illustration is not meant to be limiting as the present disclosure contemplates other embodiments where the control system 60, or at least one circuit of the control system 60, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 52) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., control system 60 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 56 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 56 may be communicably connected to the processor 52 to provide computer code or instructions to the processor 52 for executing at least some of the processes described herein. Moreover, the memory device 56 may be or include tangible, non-transient volatile memory or non-volatile memory. Accordingly, the memory device 56 may include database components, object code components, script components, or any other type of information structure for supporting the various activities and information structures described herein.

In an exemplary embodiment, the memory device 56 stores instructions for execution by the processor 52 for a process to automatically generate a work site equipment grouping. The process to automatically generate a work site equipment grouping automatically associates machines 20 connected on a near network to one or more other machines 20. In some embodiments, the automatic associations are based on rule stored on a work machine or on another network node. In some embodiments, the association rules are based on one or more of a work site designation, a location of a machine, or a code (e.g. a customer key, a manufacturer key, or a maintainer key).

Figure 2:
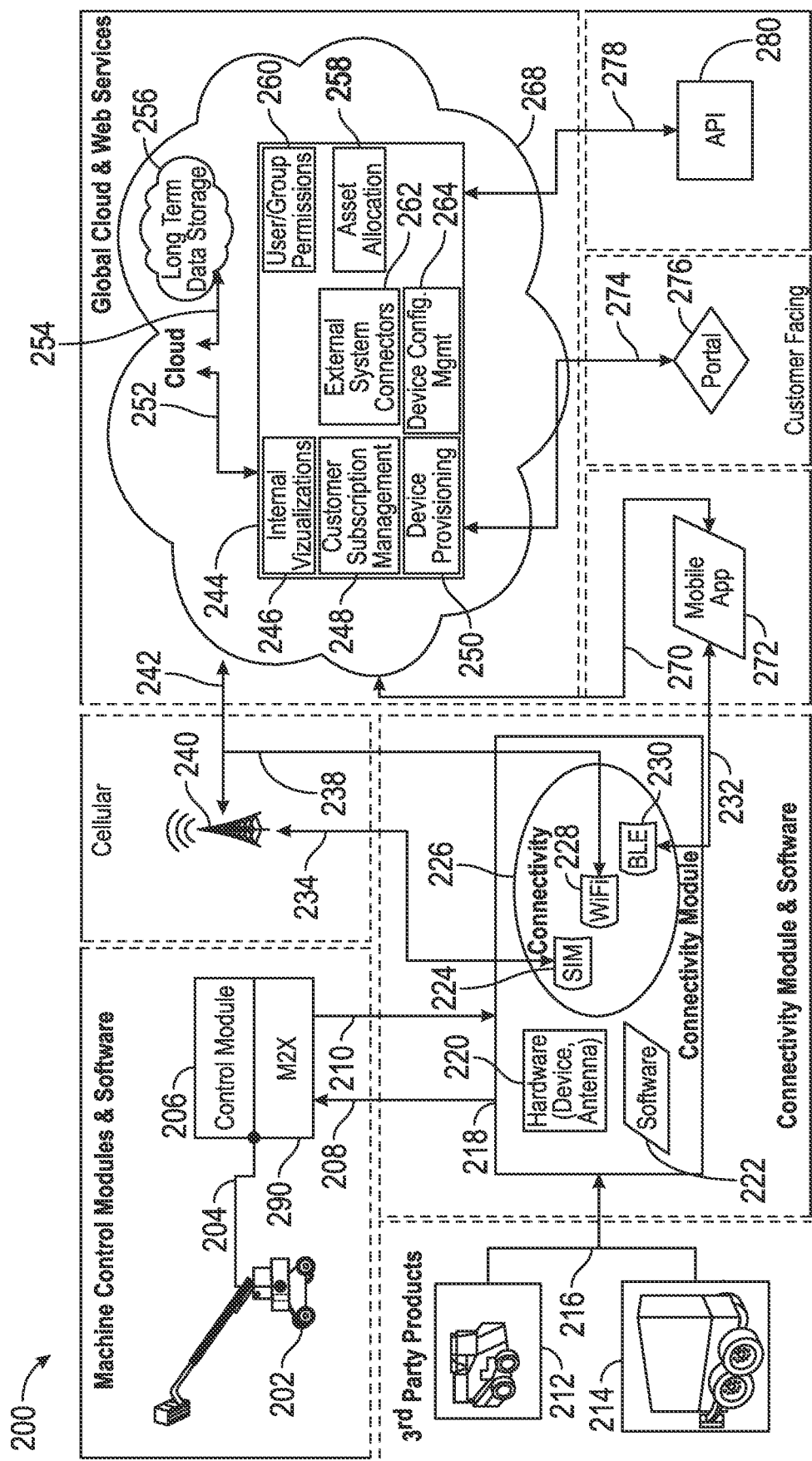
FIG. 2 is a schematic representation of a local fleet connectivity system, according to some embodiments.

As shown in FIG. 2, the system for equipment identification system 200 is supported by a network of nodes. The network of nodes may include one or more work machines 202, each with a control module 206, one or more connectivity modules 218, and one or more network devices hosting, for example, user devices 272 including user interfaces, network portals 276, application interfaces/application programming interfaces 280, data storage systems 256, cloud and web services, and product development tool and application hubs 244.

The work machine 202 is communicably connected to a control module 206. The connection 204 between the work machine 202 and the control module 206 may be wired or wireless thus providing the flexibility to integrate the control module with the work machine 202 or to temporarily attach the control module 206 to the work machine 202. The control module 206 may be configured or may be reconfigurable in both hardware and software to interface with a variety of work machines 202, 212, 214 via the connectivity module 218. The control module 206 may comprise an integral power source or may draw power from the work machine 202 or another external source of power. Control modules 206 may be installed on or connected, e.g., via a connection 216, to products (e.g. third party products 212, 214) not configured by the original product manufacturer with a control module 206.

The work machine 202 communicably connects to the equipment identification system 200 via a machine-to-X (M2X) module 290. The M2X module 290 is communicably connected to the control module 206. The M2X module 290 establishes one or more communications channels 208, 210 with a connectivity module 218. The connectivity module 218 provides a plurality of links between one or more work machines 202, 212, 214 and the equipment identification system 200. Applications providing functions for the equipment identification system 200 may be run by the M2X modules on one or more work machines 202. One or more user devices 272 may be configured to communicate (e.g., to exchange commands, codes (e.g. a customer key) and data) with the connectivity modules of one or more machines via a network connection, for example via a local wireless connectivity system or via a cellular networks (e.g., via cell towers 240) to form a network of interconnections among machines, devices, or nodes. Connections between machines and user devices in the equipment identification system 200 may be provided by a wireless mesh network, for example.

The connectivity module 218 comprises hardware 220, further comprising antennas, switching circuits, filters, amplifiers, mixers, and other signal processing devices for a plurality of wavelengths, frequencies, etc., software hosted on a non-volatile memory components 222, and a communications manager 226. The communications manager 226 may comprise processing circuits with communications front ends 224, 228, and 230 for one or more signal formats and waveforms including, for example, Bluetooth, Bluetooth low energy, Wi-Fi, cellular, optical, and satellite communications. The connectivity module 218 may function as a gateway device connecting work machine 202 to other work machines 212, 214, remote computing systems 244, 272, 276, and 280, beacons, scheduling or other fleet management and coordination systems.

The equipment identification system 200 allows for the coordination of multiple machines 202, 212, 214 within the same work site, or a fleet wide control. For example, a work machine 202 may remotely report the results of a self-inspection to a user via a user device 272 including a user interface.

The equipment identification system 200 provides connectivity between work machines 202, 212, 214 and remotely hosted user devices 272 including user interfaces, network portals 276, application interfaces/application programming interfaces 280, data storage systems 256, cloud and web services 268, and product development tool and application hubs 244 that function as an Internet of Things (IoT) system for operation, control, and support of work machines 202, 212, 214 and users of work machines. Connections 232, 234, 238, 242, 252, 254, 270, 274, and 278 between nodes connected to the equipment identification system 200 may comprise, for example, cellular networks (e.g., via cell towers 240), or other existing or new means of digital connectivity.

Product development tool and application hubs 244 may comprise tools and applications for internal visualizations 246, customer subscription management 248, device provisioning 250, external systems connectors 262, device configuration management 264, user/group permissions 260, asset allocation 258, fleet management, compliance, etc.

Figure 3:
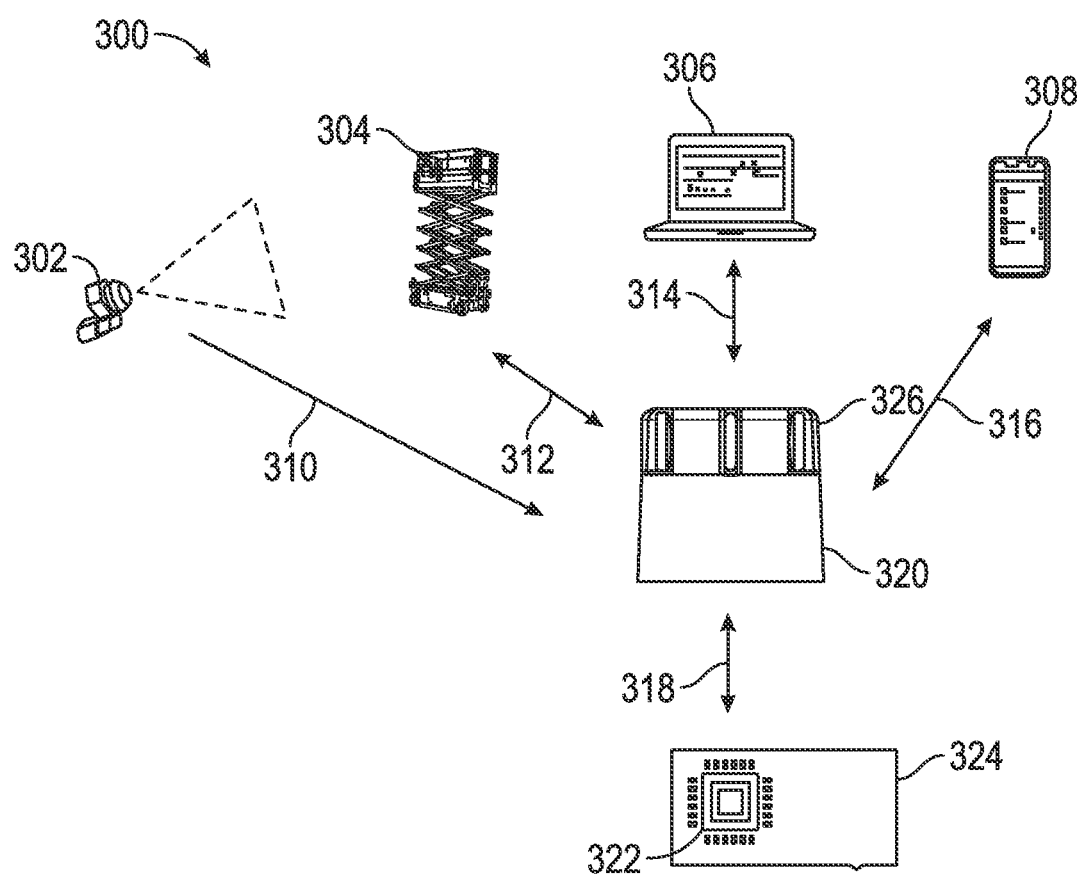
FIG. 3 is a schematic representation of a local fleet connectivity system with a central integration module, according to some embodiments.

FIG. 3 shows an equipment identification system 300 according to an exemplary embodiment. As shown in FIG. 3, the connectivity module 320 functions as a communications interface between a control system 322 of the work machine 324 and other elements connected to the equipment identification system 200. The connectivity module 320 may be part of the work machine 324 or may be physically coupled to the work machine 324. The connectivity module 320 may exchange commands and data 318 with the control system 322 of the work machine 324, sensor data 310 with auxiliary sensors 302, machine data 312 with another machine 304, commands and data 314 with a node or portal 306, and commands and data 316 with a user device 308 running an application for the equipment identification system 300. The connectivity module 320 may exchange commands, codes (e.g. a customer key) and data between work machines 304, 324, user devices 308, and/or nodes 306 to form a network of interconnections among machines, devices, or nodes.

For example, in response to a user selection on an application hosted on the user device 308, one or more machines can be located and/or identified by one or both of a visual or audible signal from the selected machine or from the connectivity module coupled to the machine. For example, the connectivity module 320 may also include and/or function as a beacon 326 that may include one or both of a light or sound generator and may be configured to identify a machine by generating one or both of a visual or audible signal (e.g. alerts, indications, etc.). The connectivity module 320 may, for example, include a beacon 326 that includes a light (e.g., an RGB LED light) which is lit when a user presses a button on an application (e.g. an identify-my-machine application on a user device 308). Additionally or alternatively, the connectivity module 320 may be communicatively coupled to one or more lights (e.g., headlights, cabin lights, etc.) of the work machine 324 (e.g., via the control system 322) and can instruct the lights to generate the visible signals in response to the selection of a button on the user device 308. The beacon 326 may additionally or alternatively include a speaker to provide the audible signals. Additionally or alternatively, the connectivity module 320 may be communicatively coupled to a horn of the work machine 324 (e.g., via the control system 322) and can instruct the horn to sound to generate the audible signal in response to the selection of a button on the user device 308. The visual and audible signals can be used in conjunction or independently of one another. The beacon 326 may emit any or all combinations of frequency, color, patterns etc. of light and may emit any sound or message (e.g., recorded or computer generated speech). The connectivity module 320 may be a self-contained unit. For example, the connectivity module 320 may be installed on or connected to machines not configured by the original product manufacturer with a connectivity module 320 and may be configured to communicate with the control module of the machine.

The equipment identification system 300 may, for example dynamically filter a user interface map to illustrate a total machine population connected to the equipment identification system. In a further example, a remote user may apply a filter to a specific work site network, much the same as can be done locally, via a mobile application. This allows a remote user to apply the desired user configurable rules to assist a local user that does not have access to a user interface of the equipment identification system 300. In some embodiments, the beacon 326 on the connectivity module 320 may include a light that may be used to illustrate or illuminate various machine statuses (e.g. fuel level, battery level, maintenance status, ignition on/off, in operation, etc.). For example, the light on the beacon 326 may be green when the fuel level is high and red when the fuel level is low. An application on a user device 308 can be used as an interface for a user to select which status they want to be displayed on a fleet within the connected range (e.g., distance, selected area, etc.) of a user device. The user may selectively command the beacons of one or more machines within the selected range to indicate the status or condition of the associated machine. For example, a user may select an option that turns the light green on machines that are to be used and turns the light red on machines that are not to be used. In some examples, selections may be independent of or in conjunction with the filter criteria of a desired subset of a fleet. In some embodiments, the user device 308 may be configured to send a command to the connectivity module 320 of a selected machine to power up or power down the machine. In some embodiments, the user device 308 may be configured to send a command to the connectivity module 320 of a selected machine to enable or disable operation of the machine.

The equipment identification system 300 allows for the coordination of multiple machines 324, 304 within the same work site, or a fleet wide control. For example, if a first work machine 304 is required to accomplish a task collaboratively with a second work machine 324, a user interacting with a user device 308 may provide commands to the first work machine 304 and second work machine 324 to execute the task in collaboration.

Figure 4:
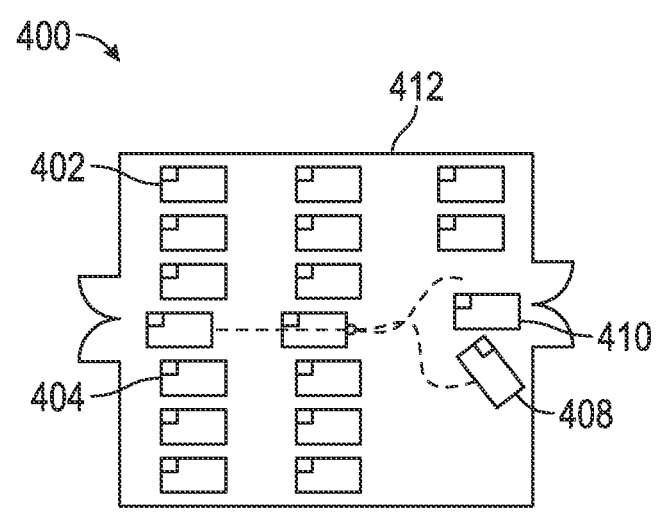
FIG. 4 is a schematic representation of a work site and equipment staging area with a local fleet connectivity system deployed, according to some embodiments.

As shown in FIG. 4, the equipment identification system 400 may be deployed at a work site 412 to control a fleet of work machines 402, 404, 408, 410 via the connectivity module 406 to collaboratively perform tasks requiring more than one work machine 408, 410. For example, a user may wish to move the work machine 410 from its stored position on the left of the work site 412 out the door on the right of the work site. The connectivity module may communicate with both the work machine 408 and the work machine 410, causing the work machine 408 to move out of the way of the work machine 410, so that the work machine 410 can move past the work machine 408 and out the doorway.

Figure 5:
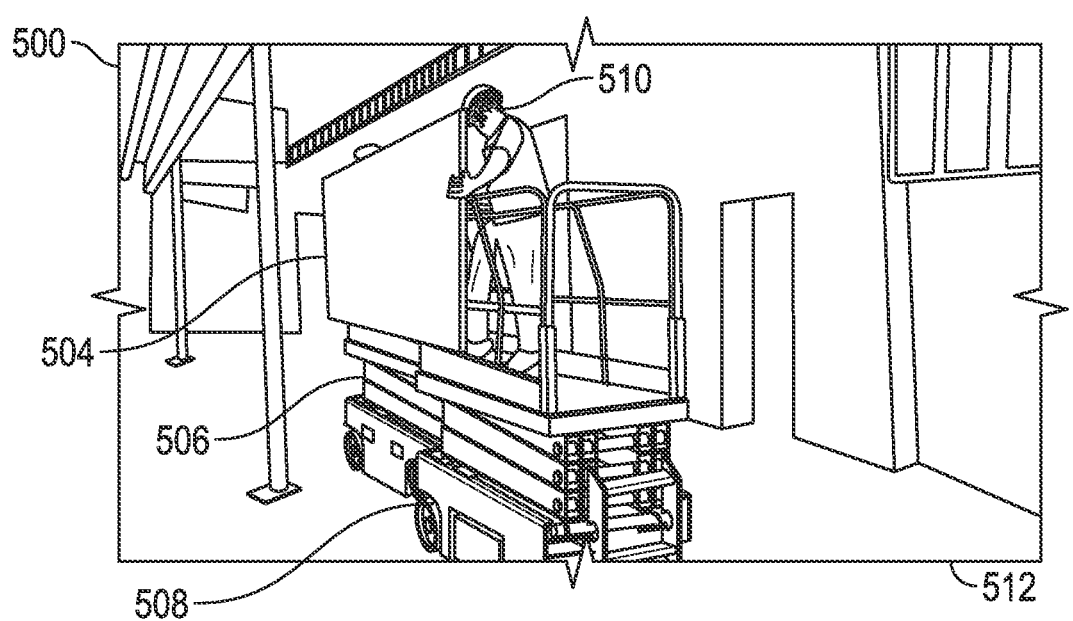
FIG. 5 is a picture representation of a work site with a local fleet connectivity system connecting two pieces of equipment, according to some embodiments.

As shown in FIG. 5, a plurality of work machines 506, 508 connected to equipment identification system 500 may collaboratively perform tasks on a jobsite 512 requiring more than one work machine, for example emplacing a section of drywall 504 that is too large to be handled by a single work machine. A user device may communicate with both the work machine 506 and the work machine 508 and cause them to move at the same speed and in the same direction so that a user 510 on each machine 506, 508 can hold the drywall 504 while the machines 508, 506 are moving. Connectivity between the machines 508, 508 and with the equipment identification system 500 can prevent the machines 508, 506 from being separated so that the users 510 do not drop the drywall 504.

Figure 6:
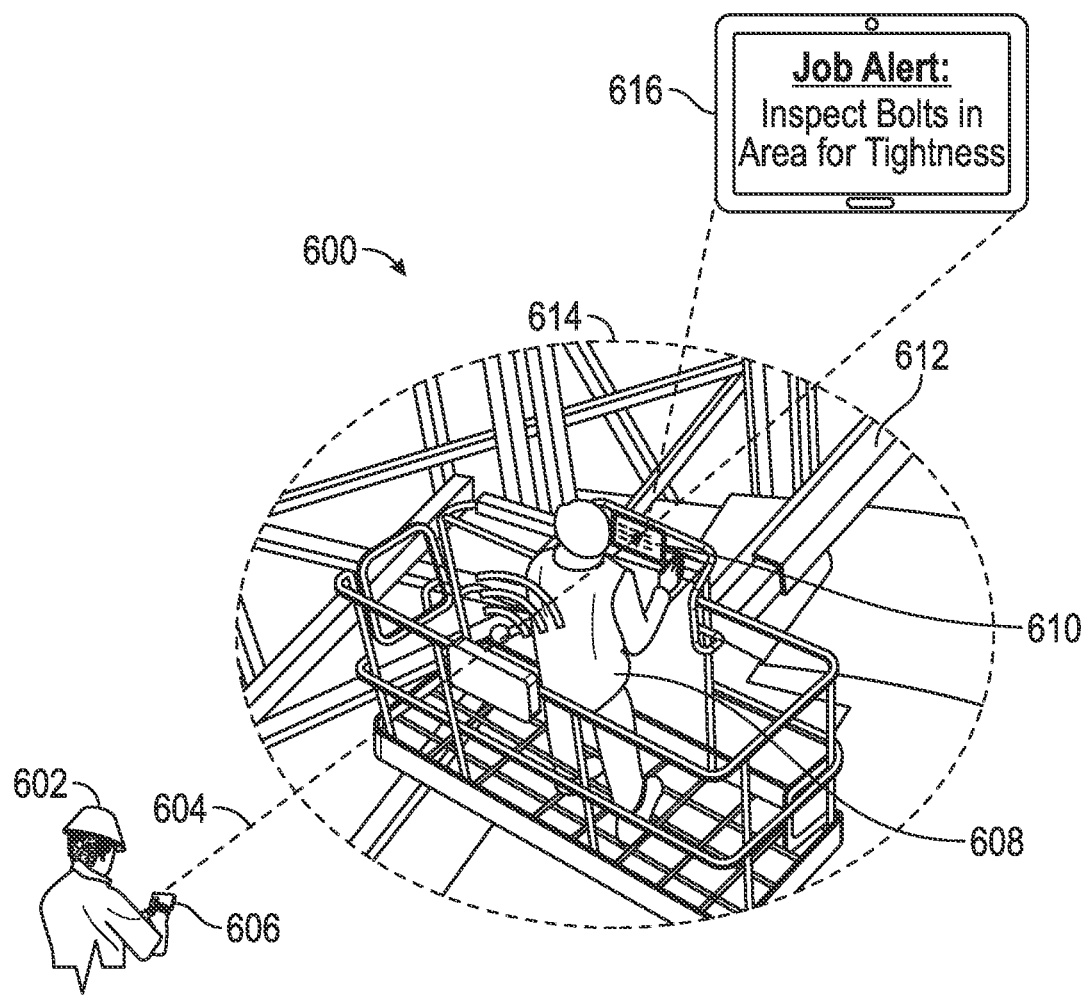
FIG. 6 is a picture representation of a piece of equipment with a local fleet connectivity system providing connectivity to a remote user, according to some embodiments.

As shown in FIG. 6, a remote user 602 of an equipment identification system 600 can send messages and data 604 from a remote device 606 to an onsite user 608 on a jobsite 614. The messages and data 604 may be received by the control system 610 of a work machine 612 and displayed via a user interface on an onboard display 616. The remote user 608 may send work instructions to the onsite user 608, informing the onsite user 608 of talks to be performed using the work machine 612. For example, as shown in FIG. 6, the remote user 602 may send instructions to the onsite user 608 to use the work machine 612 to inspect bolt tightness in the area. The instructions may displayed for the onsite user 608 on the onboard display 616. This allows the onsite user 608 to receive and view the instructions without the need to call the remote user 602 or write the instructions down. Because the work machine 612 is connected to the remote device 606 (e.g., via a connectivity module 218) the remote user 602 may receive the location of the work machine 612, as well as other work machines on the jobsite 614, and may use the location information to determine the instructions to send.

Figure 7:
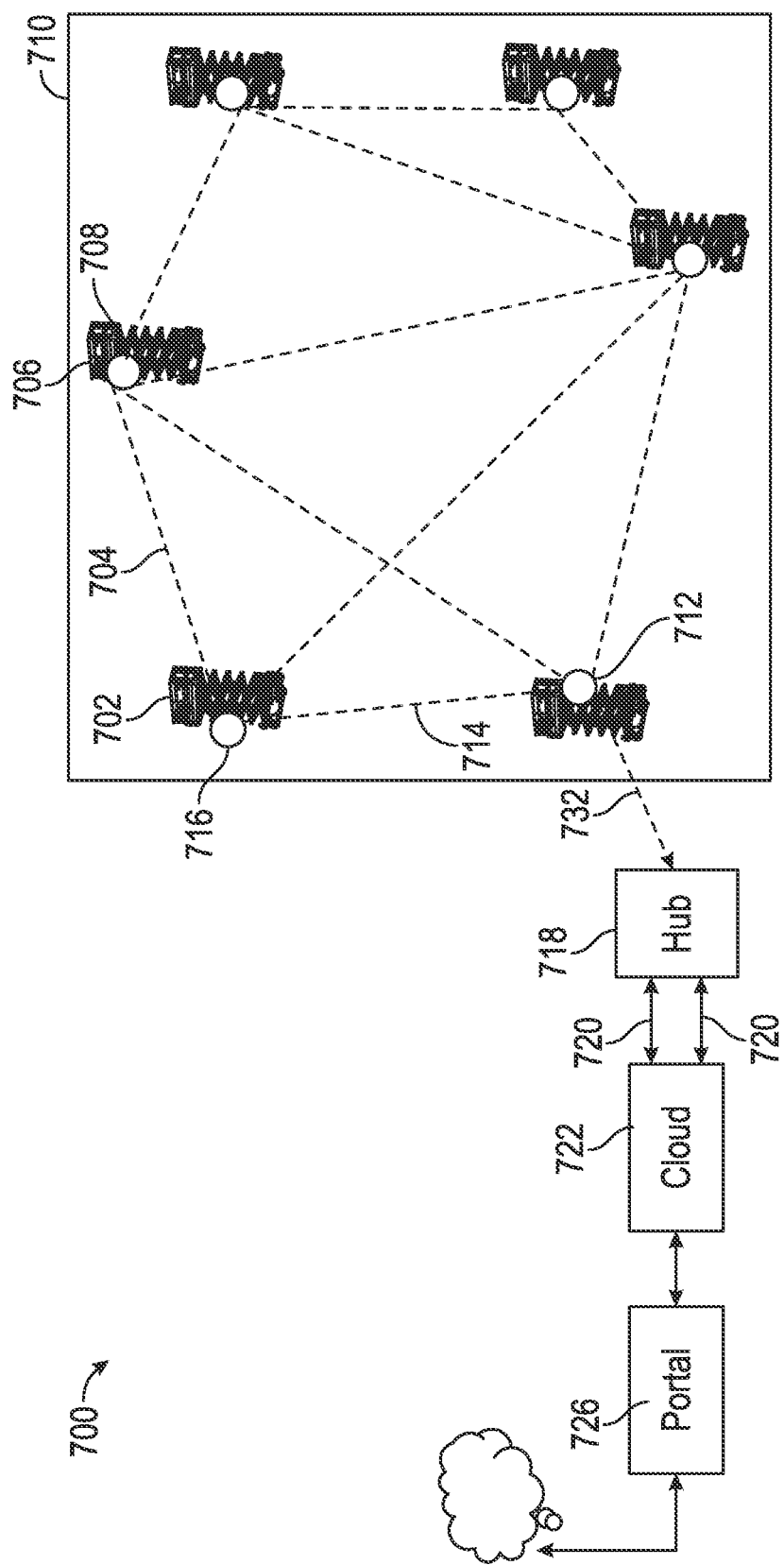
FIG. 7 is a schematic representation of a work site with a local fleet connectivity system deployed with connectivity to off-site systems, according to some embodiments.

Referring to FIG. 7, a local fleet connectivity network system 700 includes a connectivity hub 718. In some embodiments, the connectivity hub includes a connectivity module. In some embodiments, the connectivity hub is configured to communicatively connect with one or more connectivity module equipped machines 702, 706 in proximity to the connectivity hub 718. In some embodiments, the connectivity hub is configured to broadcast a work site identification signal. In some embodiments, the connectivity hub is configured to connect work site machines 702, 706 connected to the local fleet network to an external internet feed 720. In some configurations, the connectivity hub is configured as a gateway to one or more communications systems or network systems to enable exchanges of data 720, 722 between nodes 708, 712, 716 on the work site 710 local fleet connectivity mesh network 704, 714, 732 and nodes 726 external to the work site.

In some embodiments, connectivity hub has a connectively module to (a) provides the functionalities described here in place of or in addition to a machine that has a connectivity module, (b) broadcasts a site identifier, or (c) connects to an external internet to flow through data to and from the jobsite that is provided across the mesh.

Figure 8:
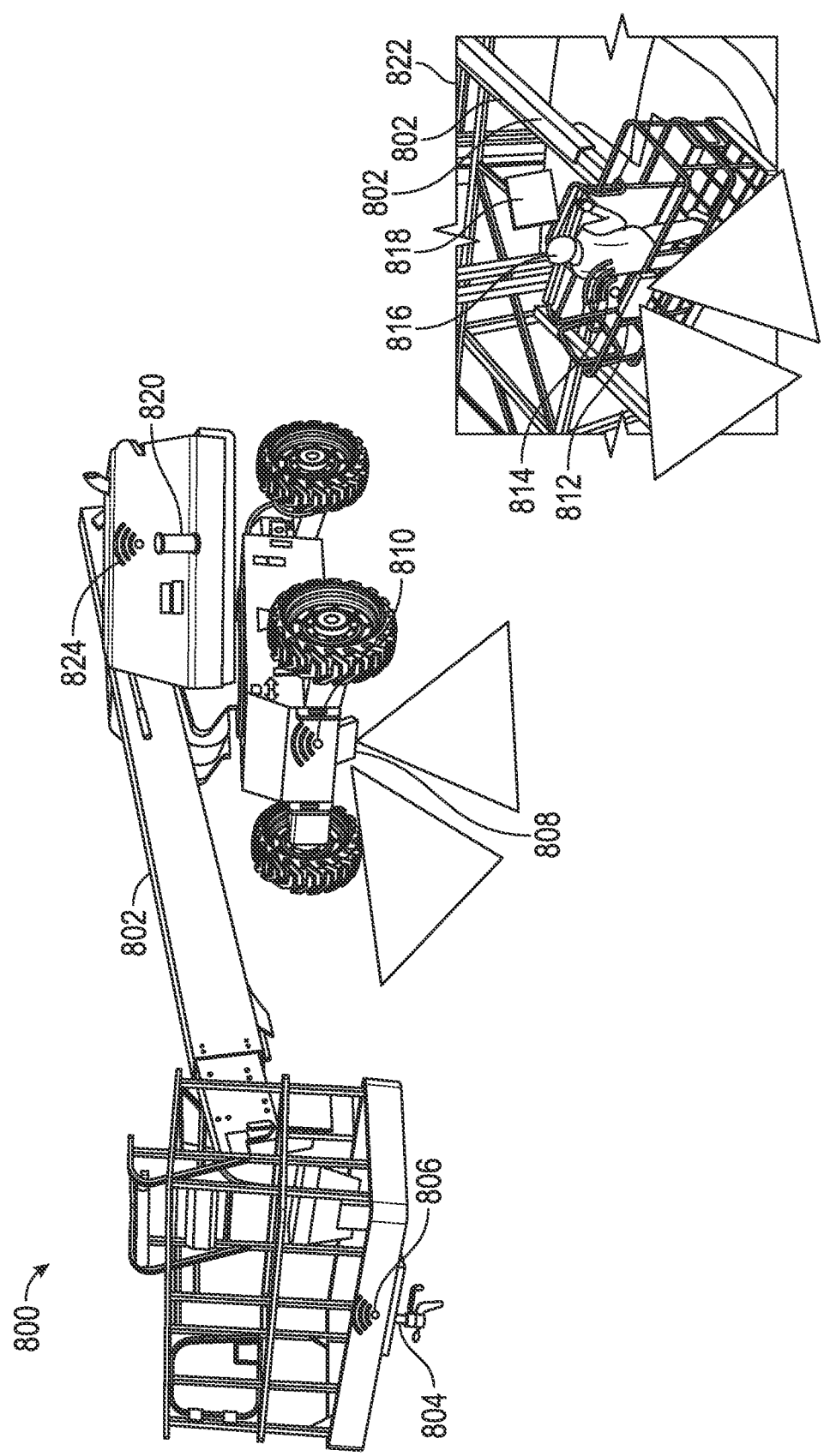
FIG. 8 is a picture representation of an apparatus configured with a local fleet connectivity system, according to some embodiments.

Referring to FIG. 8, a sensor network system 800 is shown. Sensors 804, 808, 812, 820 may be coupled to a work machine 802 on a jobsite 822. The sensors may be, for example, object detection sensors 808 812, environmental sensors 804 (e.g., wind speed, temperature sensors), and tagged consumable sensors 820. The sensors 804, 808, 812, 820 may be connected to and may send data to an equipment identification system via wireless connections 806, 810, 814, 824. The sensor data may displayed or may be used to generate messages for display on an onboard display 818 for a user 816 of the work machine 802. The onboard display 818 may receive the sensor data via a direct wired or wireless connection to the sensors. Alternatively the sensors may communicate with the onboard display through the equipment identification system (e.g., via a connectivity module 218). Sensor data from various work machines may be combined to map the jobsite 822 and to determine if environmental conditions are safe for using the work machines. Sensor data from the tagged consumable sensors 820 may be used to determine, for example, when tagged consumables must be replaced.

Figure 9:
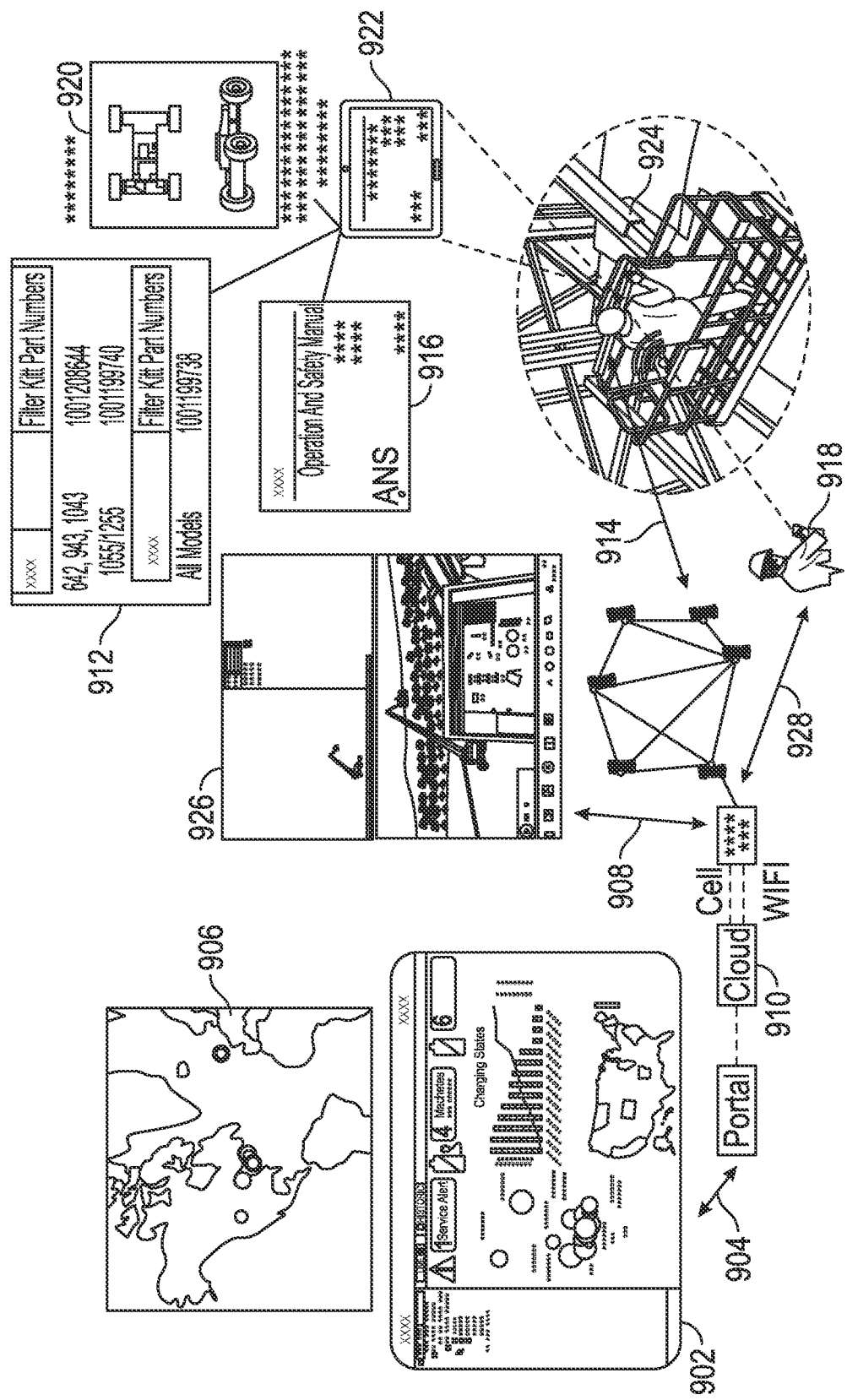
FIG. 9 is a graphical user interface of the local fleet connectivity system of FIG. 2, according to some embodiments.

As shown in FIG. 9, various user interfaces are available to be displayed on a remote user device 918 and an onboard display 922 of a work machine 924. A connectivity hub 910 may send and receive data 928, 908, 904 914 including the user interfaces 902, 906, 912, 916, 926, 920. The user interface 906 is a heatmap of locations of a plurality of work machines. The user interface 902 is a machine status display that shows the battery level, location, and alerts relating to a plurality of work machines. User interface 926 shows a digital twin of a work machine that updates based on sensor data of an associated work machine. User interface 912 is a list of part numbers for the work machine 924. User interface 916 is an operation and safety manual for the work machine 924. User interface 920 is a detailed schematic of the work machine 924.

Figure 10:
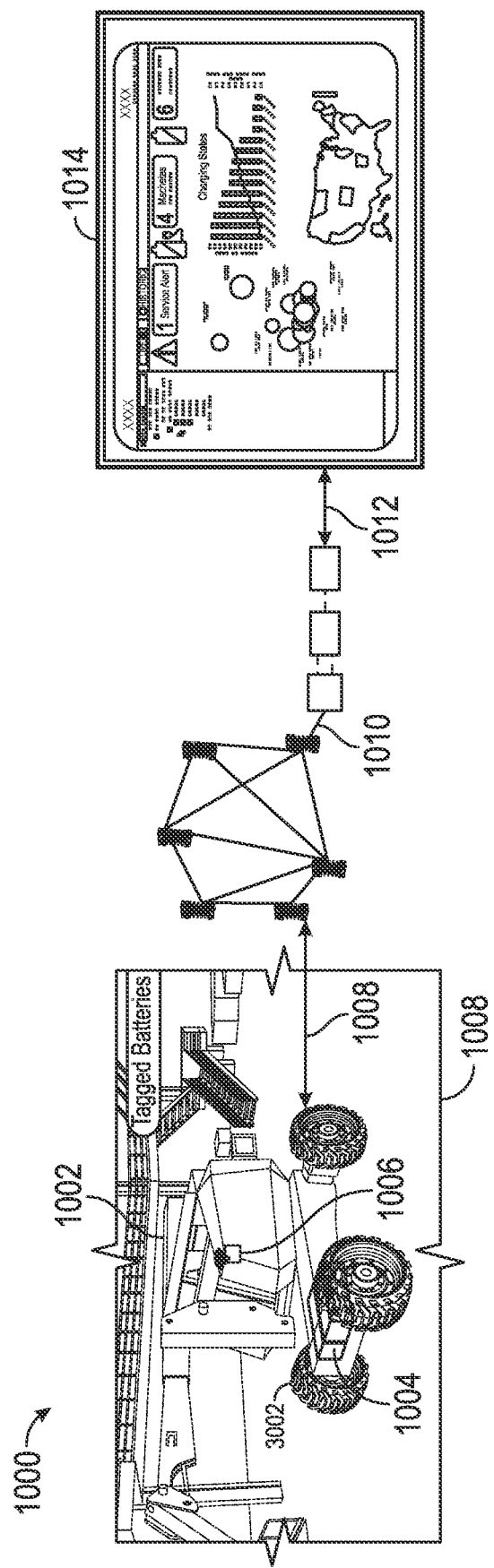
FIG. 10 is a picture representation of a work machine with machine specific output data connected to the local fleet connectivity system of FIG. 2, according to some embodiments

As shown in FIG. 10, a tagged consumable tracking system 1000 is shown. A work machine 1002 on a jobsite 1008 includes tagged consumables 1004 (e.g., batteries connected to battery charger 1006). The machine 1002 sends and receives data 1016 to and from the connectivity hub 1010. The connectivity hub 1010 sends and receives data 1012 to and from a user interface 1014. Data regarding the tagged consumables 1004 may be communicated to the user interface 1014 via the connectivity hub 1010. For example, battery charge state and battery health may be sent to the user interface 1014. When the battery health falls below a predetermined state, for example, when the battery is only able to hold half of its original charge, the connectivity hub 1010 may send an alert to the user interface 1014 indicating that the battery should be replaced.

Figure 11:
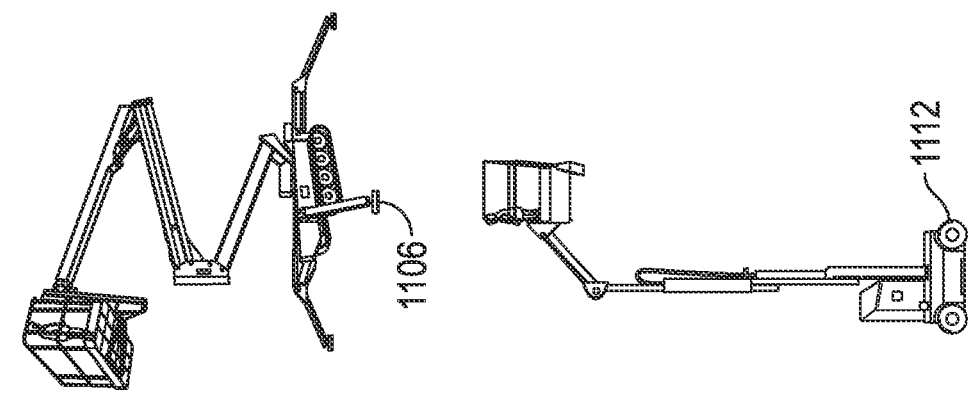
FIG. 11 is a picture representation of work machines configured for use in the local fleet connectivity system of FIG. 2, according to some embodiments.
Figure 11:
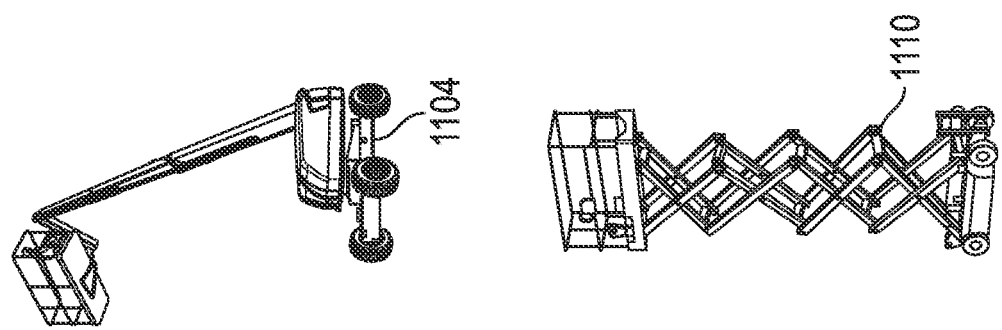
Figure 11:
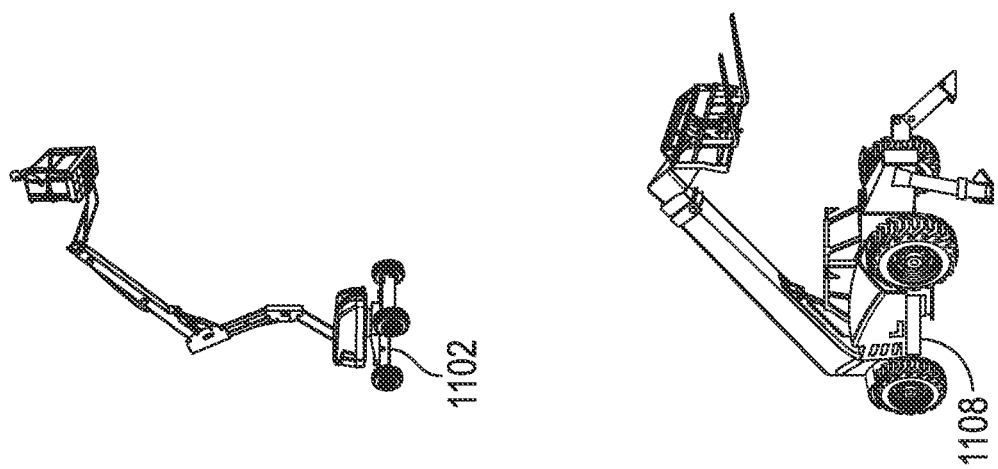

FIG. 11 shows various embodiments of a work machines 20 (e.g., lift devices including articulating boom lift 1102, telescoping boom lift 1104, compact crawler boom list 1106, telehandler 1108, scissor lift 1110, toucan mast boom lift 1112). As an example, telescoping boom lift 1104 includes a chassis (e.g., a lift base), which supports a rotatable structure (e.g., a turntable, etc.) and a boom assembly (e.g., boom). According to an exemplary embodiment, the turntable is rotatable relative to the lift base. According to an exemplary embodiment, the turntable includes a counterweight positioned at a rear of the turntable. In other embodiments, the counterweight is otherwise positioned and/or at least a portion of the weight thereof is otherwise distributed throughout the work machines 20 (e.g., on the lift base, on a portion of the boom, etc.). As shown in FIG. 11, a first end (e.g., front end) of the lift base is supported by a first plurality of tractive elements (e.g., wheels, etc.), and an opposing second end (e.g., rear end) of the lift base is supported by a second plurality of tractive elements (e.g., wheels). The front tractive elements and the rear tractive elements include wheels of telescoping boom lift 1104; however, in other embodiments the tractive elements include a track element.

As shown in FIG. 11, the boom of telescoping boom lift 1104 includes a first boom section (e.g., lower boom, etc.) and a second boom section (e.g., upper boom, etc.). In other embodiments, the boom includes a different number and/or arrangement of boom sections (e.g., one, three, etc.). According to an exemplary embodiment (e.g., articulating boom lift 1102), the boom is an articulating boom assembly. In one embodiment, the upper boom is shorter in length than lower boom. In other embodiments, the upper boom is longer in length than the lower boom. According to another exemplary embodiment, the boom is a telescopic, articulating boom assembly. By way of example, the upper boom and/or the lower boom may include a plurality of telescoping boom sections that are configured to extend and retract along a longitudinal centerline thereof to selectively increase and decrease a length of the boom.

As shown in FIG. 11, the lower boom of telescoping boom lift 1104 has a first end (e.g., base end, etc.) and an opposing second end (e.g., intermediate end). According to an exemplary embodiment, the base end of the lower boom is pivotally coupled (e.g., pinned, etc.) to the turntable at a joint (e.g., lower boom pivot, etc.). The boom includes a first actuator (e.g., pneumatic cylinder, electric actuator, hydraulic cylinder, etc.), which has a first end coupled to the turntable and an opposing second end coupled to the lower boom. According to an exemplary embodiment, the first actuator is positioned to raise and lower the lower boom relative to the turntable about the lower boom pivot.

As shown in FIG. 11, the upper boom of telescoping boom lift 1104 has a first end (e.g., intermediate end, etc.), and an opposing second end (e.g., implement end, etc.). According to an exemplary embodiment, the intermediate end of the upper boom is pivotally coupled (e.g., pinned, etc.) to the intermediate end of the lower boom at a joint (e.g., upper boom pivot, etc.). As shown in FIG. 11, the boom of telescoping boom lift 1104 includes an implement (e.g., platform assembly) coupled to the implement end of the upper boom with an extension arm (e.g., jib arm, etc.). In some embodiments, the jib arm is configured to facilitate pivoting the platform assembly about a lateral axis (e.g., pivot the platform assembly up and down, etc.). In some embodiments, the jib arm is configured to facilitate pivoting the platform assembly about a vertical axis (e.g., pivot the platform assembly left and right, etc.). In some embodiments, the jib arm is configured to facilitate extending and retracting the platform assembly relative to the implement end of the upper boom. The boom includes a second actuator (e.g., pneumatic cylinder, electric actuator, hydraulic cylinder, etc.). According to an exemplary embodiment, the second actuator is positioned to actuate (e.g., lift, rotate, elevate, etc.) the upper boom and the platform assembly relative to the lower boom about the upper boom pivot.

According to an exemplary embodiment, the platform assembly is a structure that is particularly configured to support one or more workers. In some embodiments, the platform assembly includes an accessory or tool configured for use by a worker. Such tools may include pneumatic tools (e.g., impact wrench, airbrush, nail gun, ratchet, etc.), plasma cutters, welders, spotlights, etc. In some embodiments, the platform assembly includes a control panel to control operation of the work machines 20 (e.g., the turntable, the boom, etc.) from the platform assembly. In other embodiments, the platform assembly includes or is replaced with an accessory and/or tool (e.g., forklift forks, etc.).

Figure 12:
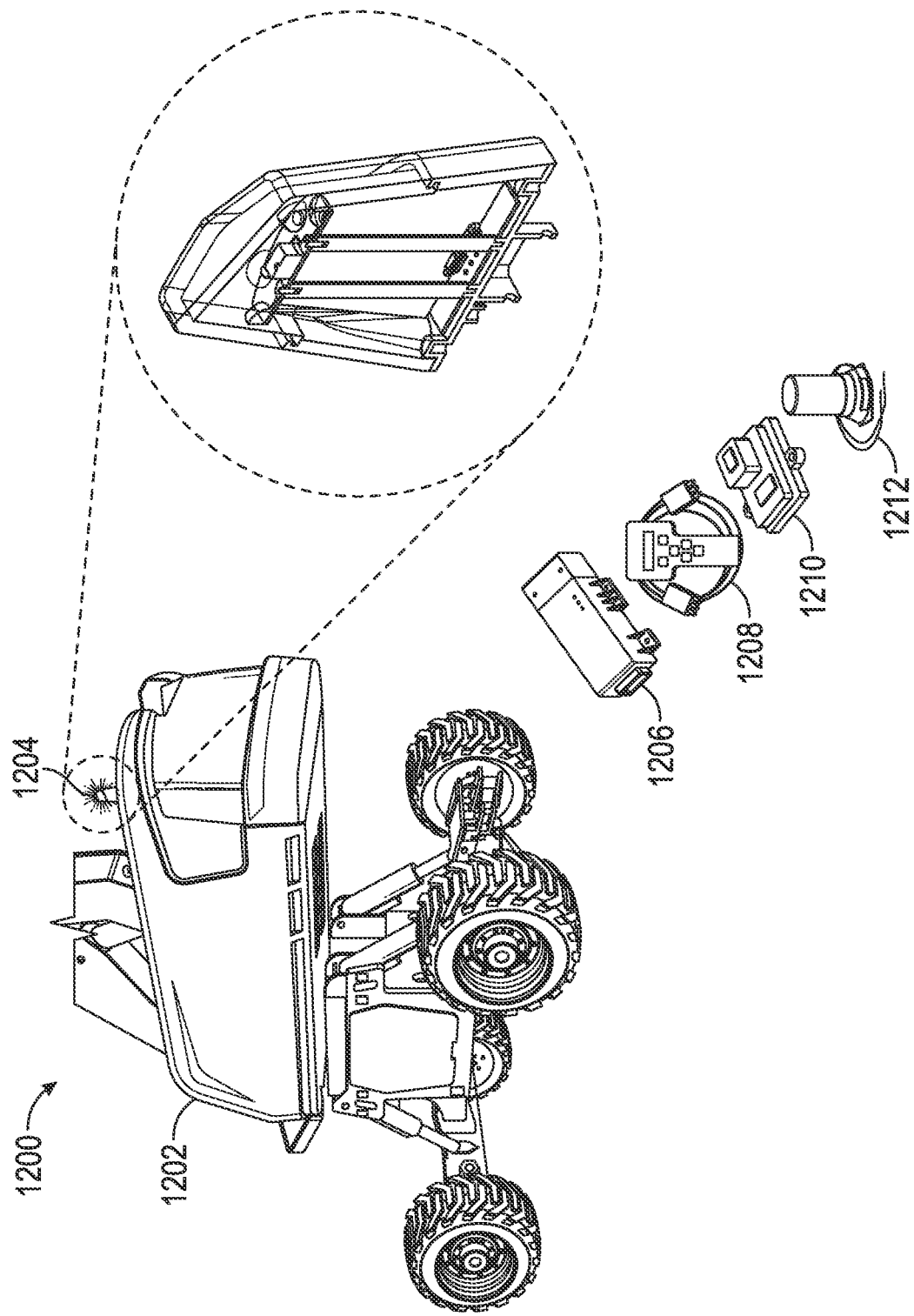
FIG. 12 is a picture representation of a work machine provisioned with an integrated connectivity module and beacon, according to some embodiments.

Referring to FIG. 12, a work machine 1202 is provisioned with an indicator 1204 (e.g. a connectivity module with integrated beacon light, control devices, and communications devices). The indicator 1204 may, for example, illuminate a light visible to a user in response to user activation of a "find my machine" or "identify my equipment" application hosted on a user device connected to the equipment identification system 200. The indicator 1204 may function like a conventional work machine warning beacon 1212.

In some embodiments, the connectivity module may be configured with a telematics control unit 1206, a multifunction light beacon 1212, one or more multi-channel communication modems 1210, one or more analytics devices 1208, one or more antennas, one or more power sources, one or more positioning systems, one or more local fleet connectivity processors, and one or more interface blocks, one or more machine connectivity provisions, and one or more memory devices. For example, the connectivity module with integrated beacon 1204 may be configured as an integrated connectivity device provisioned with all components required to connect a work machine 1202 that is not provisioned with networking equipment to a equipment identification system 200. The connectivity module with integrated beacon 1204 may include, for example, a telematics control unit specific componentry included (e.g. multicolor beacon, GPS/GNSS, communications modem, antenna, controller, memory device, interface blocks, housing, etc.) and be affixable to a work machine using temporary or permanent physical, electrical, or electronic connections. The connectivity module connected to the work machine may be configured to selectively enable, activate, disable, and deactivate components of the connectivity module and the work machine to which it is communicatively connected. For example, a connectivity module with integrated beacon 1204 connected to a work machine equipped with headlights may enable and activate the work machine headlights and disable the integral beacon in response to a "find me" command received by the connectivity module from the equipment identification system 200. The connectivity module with integrated beacon 1204 is configured, in some embodiments, to determine what components integral to the module and what components that are machine equipment are activated in response to a command such that only the components necessary to respond to the command are activated and no individual components are activated in conflict with the components activated to respond to the command.

Figure 13:
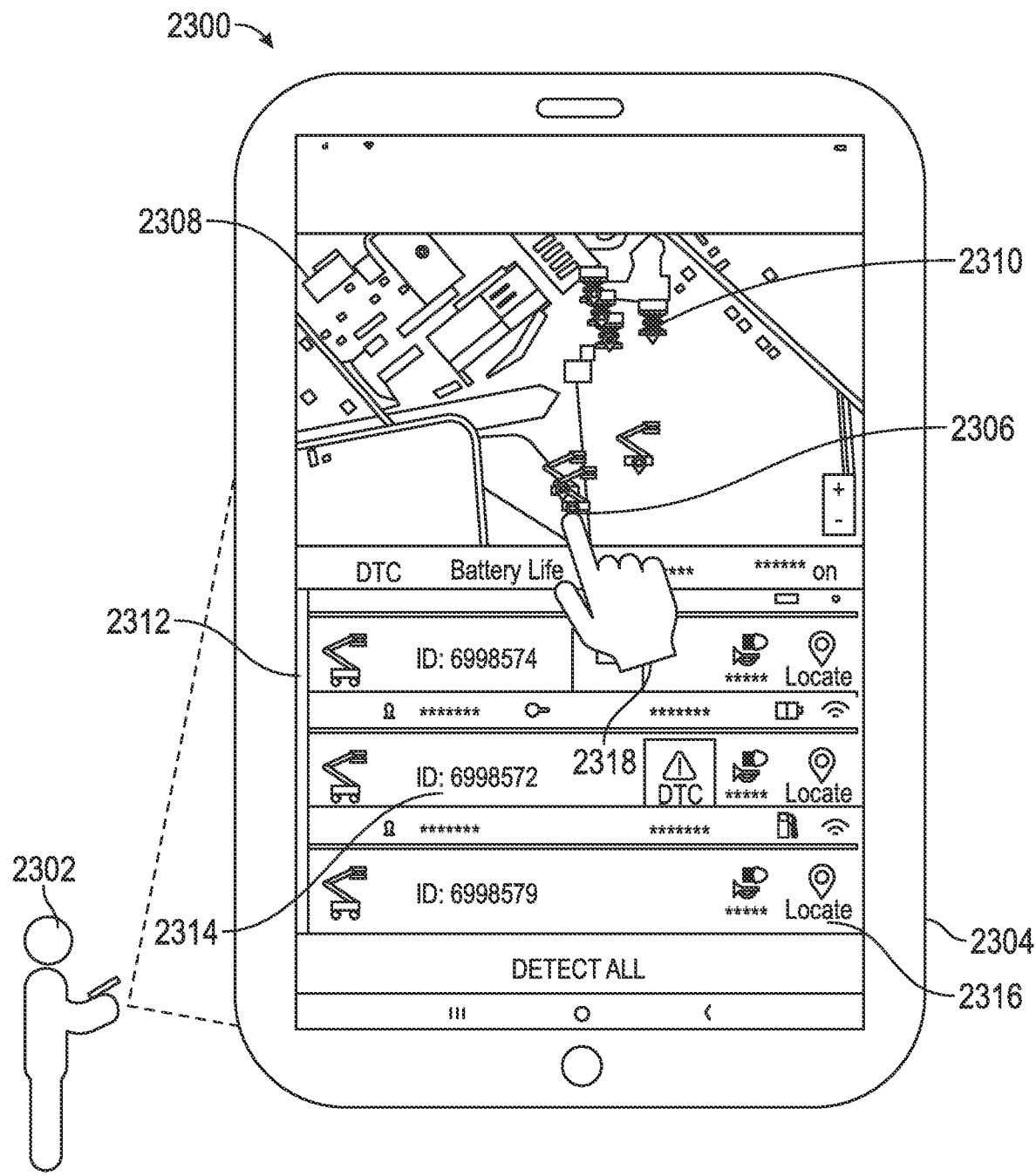
FIG. 13 is a drawing representing a view of user interface of an equipment identification system, according to some embodiments.
Figure 14:
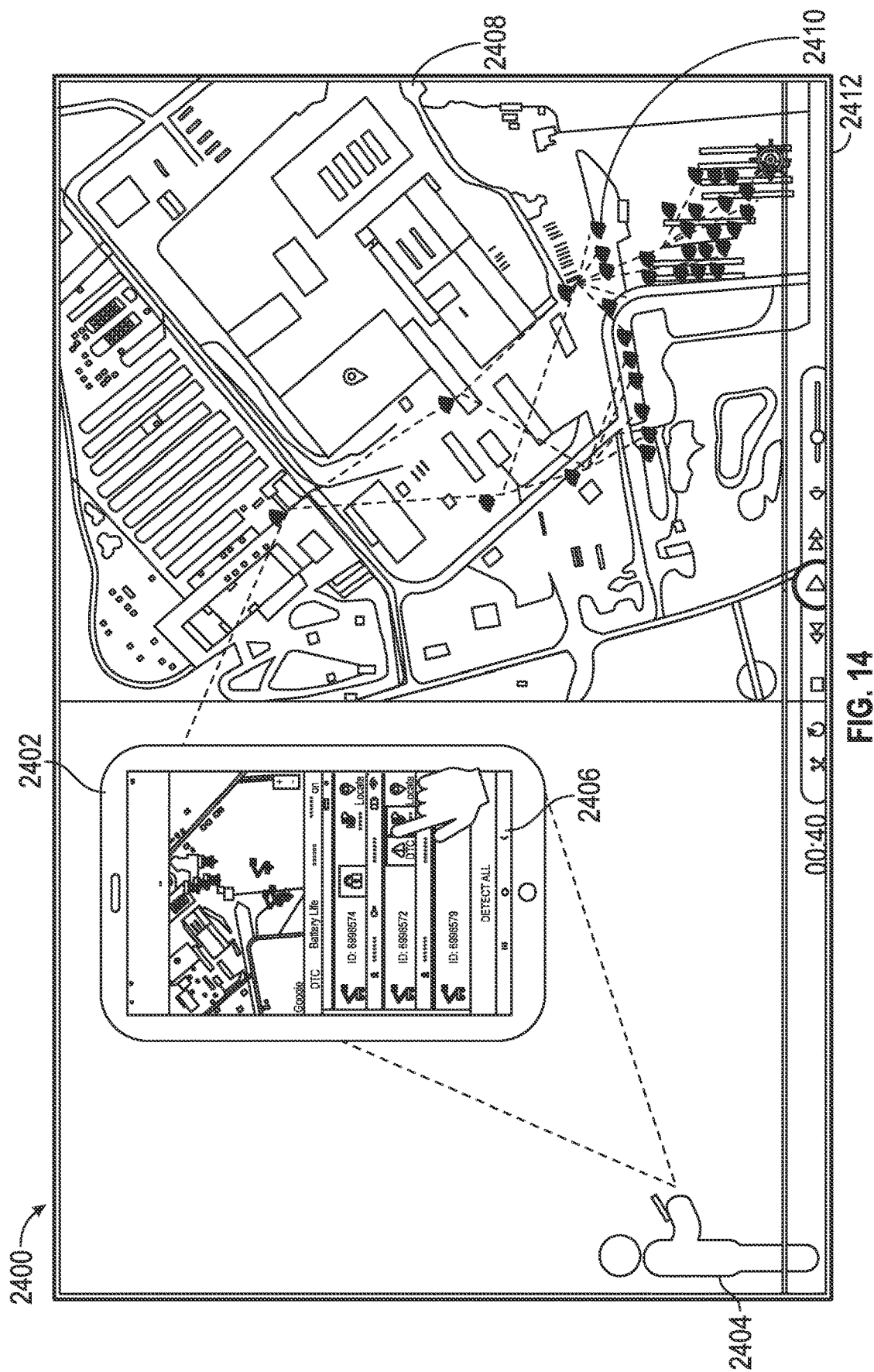
FIG. 14 is drawing of another view of the user interface of an equipment identification system of FIG. 13, according to some embodiments.

Referring to FIG. 13-14, a user 2302 may use the equipment identification system by interacting 2318 with an application hosted on a user device 2304 that generates a user interface 2308. The user device 2304 and various work machines 2306, 2310 are interconnected via the equipment identification system 200. The user 2302 selects a machine 2306 from a view 2308 of a group of a machines 2310 connected to the equipment identification system 200 at a work site. The user interface 2308 may depict, for example, imagery of a work site with overlays of machine locations (e.g. a map) 2310 and information regarding machine specific information including status (e.g. location, fuel state, state of charge, etc.) 2312, 2314, 2316. The application may dynamically filter the map to illustrate the total machine population and locations and statuses of individual machines in the population. In some examples, a remote user may apply filters (e.g. proximity to a user, filters related to machine status including self-test, fuel level, state of charge, etc.) to a specific work site network much the same as can be done locally via an application on a mobile user device (e.g. in the instance where a remote user can apply the desired user configurable rules to assist a local user w/o the need of mobile application use). The user may select a machine or group of machines using an application and communicate with the machine or group of machines (directly or via a cloud) to have that machine provide a an equipment identify indication (e.g. a colored light, a light pattern, a combination of light colors and patterns, activation of a horn).

Referring to FIG. 14, a user interface 2400 of a machine connectivity application is shown, according to an exemplary embodiment. The user interface 2400 may include a map 2408. The map may be an aerial view of a job site. The map 2408 may include machine indicators 2410 that show where machines are disposed on the map 2408. A light on a connectivity module can be used to identify a first machine 2412 of the plurality of machines within the job site and indicate various statuses of the first machine (e.g., fuel level, state of charge, fault status, ignition on/off, in operation, etc.). The application user interface 2406 on user device 2402 can be used by a user 2404 to select which status they want to be displayed on a fleet within user defined parameters (e.g., a connected range of the user device). Features of the "find me" application can be used independently of or in conjunction with the filter criteria of a desired subset of a fleet. The equipment identification system application can also provide user interfaces for other instructions or commands (e.g. allowing a machine to be powered up or shut down).

Figure 15:
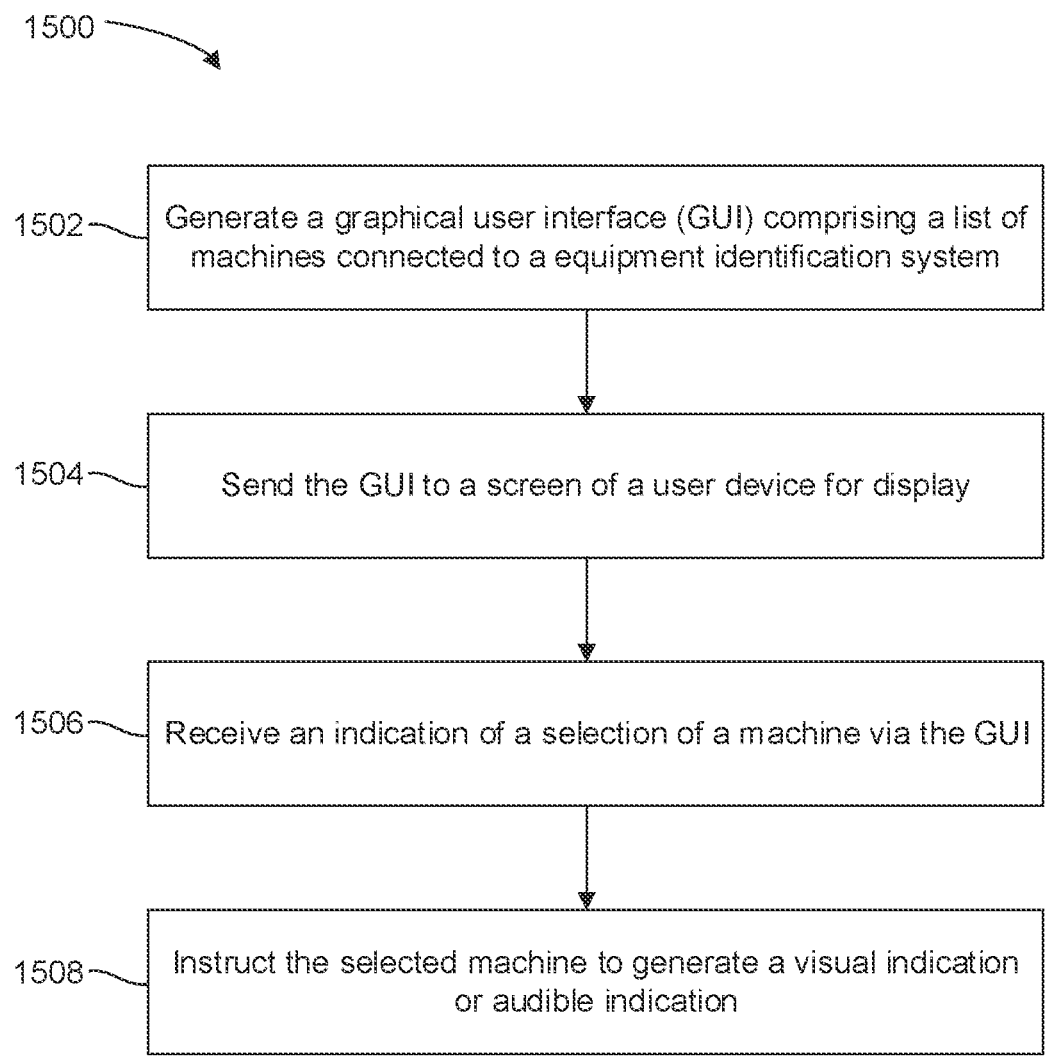
FIG. 15 is a flow diagram of a method for an equipment identification system, according to some embodiments.

Referring to FIG. 15, a process 1500 (or method) for an equipment identification system (e.g. equipment identification systems 200, 300) is shown according to some embodiments. The method may be performed by one or more processing circuits comprising one or more memory devices coupled to one or more processors. The one or more memory devices may be configured to store instructions thereon that, when executed by the one or more processors, cause the one or more processors to perform the operations of the method. In some embodiments, the one or more processing circuits may be integrated into a remote computing system (e.g. cloud and web services 268). In other embodiments, the one or more processing circuits may be integrated into a user device (e.g. user device 272). One or more machines may connect to the user device via a local wireless connectivity system or via a cellular networks (e.g., via cell towers 240), or other existing or new means of digital connectivity. Each machine may include a connectivity module for communicating with the equipment identification system (e.g. connectivity modules 218, 320). The one or more processing circuits may communicate across a wireless network by sending messages to the one or more machines and to one or more user devices each communicatively connected to the network. A user may interact with the machines via an application provided on the user device that displays a graphical user interface (GUI).

Following the activation of an equipment identification system and deployment of machines to a work site, machines connect to the system and are identified digitally within the system and applications provided through the system. Process 1500 begins at operation 1502 with the generation of a GUI including a list of one or more of the machines connected to the equipment identification system. In some embodiments, the list may include additional information regarding each machine (e.g., fuel level/SOC, DTC status, ignition on/off, in operation, etc.). In some embodiments, the list may include location information regarding each machine (e.g., work site name, latitude and longitude etc.). In some embodiments, the GUI may include a map with the location of each machine, as shown in FIG. 13. At operation 1504, the GUI is sent to a screen of a user device for display. The user device may be, for example, a smartphone, a tablet computer, a laptop computer, a desktop computer, or any device with a screen to display the GUI and that allows the user to interact with the application (e.g., to receive machine data, to send messages, instructions, or commands to the machines, etc.).

At operation 1506, an indication of a selection of a machine is received via the GUI. For example, a user may select a machine by clicking the machine name on the list of machines on the GUI with a mouse or touching it on a touchscreen device. At operation 1508, in response to receiving the selection of a machine from the list, an instruction is sent to the selected machine to generate a visual indication or audible indication. It should be understood that instructing the machine to generate an indication may include instructing a connectivity module coupled to the machine to generate the indication. The user may then identify the selected machine based on the visual or audible indication generated by the indicator. The indicator may be, for example, a beacon integrated into the connectivity module that includes a light which is lit when the instruction to generate the indication is received. Additionally or alternatively, the connectivity module can instruct the machine's lights (e.g., headlights, cabin lights, etc.) to act as the visible indicator. The beacon may additionally or alternatively include a speaker to provide the audible indication. Additionally or alternatively, the connectivity module can instruct the machine's horn to act as the audible indicator. The visual and audible indicators can be used in conjunction or independently of one another.

As an example of process 1500, a worksite may have ten machines (e.g., scissor lifts) that are the same model. The scissor lifts may connect to the equipment identification system. A user device (e.g., a tablet computer) may also connect to the equipment identification system. A GUI may be generated and displayed on the screen of the tablet computer. The GUI may include a list of the ten scissor lifts and their respective fuel levels. If, for example, one of the scissor lifts has a fuel level that is very low, the user may select that scissor lift. After the section is received, an instruction may be sent to the selected scissor lift to activate the beacon light of the connectivity module coupled to the selected scissor lift and generate a visual indication. The user may then locate the selected scissor lift based on the visual indication and refuel the selected scissor lift.

The user may apply one or more dynamic filters (e.g., machine feature or status criteria) to a map of machines at a work site through the application to illustrate one or more machine population. In some implementations, the user may apply such a filter to a specific jobsite network much the same as can be done locally via a mobile application. The process 1500 may also include using a visual or audible indication on the machine to illustrate various statuses of the machine (fuel level/SOC, battery level, DTC status, ignition on/off, in operation, etc.). For example an indication of a selection of a status or condition may be received via the GUI on the user device, and a message may be sent in response to the selection instructing the selected machines to indicate the selected status or condition using one or both of the visual or audible indication. The process 1500 may further include using the application as an interface for a user to select which status they want to be displayed on a fleet of machines within a connected range of the user's device or within a designated proximity to a user. The method may also include a user sending commands to a machine through the application (e.g. commanding an identified machine to be powered up or shut down, disabling or enabling an identified machine, etc.). For example an indication of a selection of on option to power up or power down a machine may be received via the GUI on the user device, and a message may be sent in response to the indication instructing the selected machine to power up or power down. As another example, an indication of a selection of on option to enable or disable a machine may be received via the GUI on the user device, and a message may be sent in response to the indication instructing the selected machine to enable or disable operation of the machine.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIGS. 1-3, it should be understood that the controller 44 may include any number of circuits for completing the functions described herein. For example, the activities and functionalities of the control system 60 may be combined in multiple circuits or as a single circuit. Additional circuits with additional functionality may also be included. Further, the controller 44 may further control other activity beyond the scope of the present disclosure.

As mentioned above and in one configuration, the "circuits" of the control system 60 may be implemented in machine-readable medium for execution by various types of processors, such as the processor 52 of FIG. 1. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Although this description may discuss a specific order of method steps, the order of the steps may differ from what is outlined. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. An equipment identification system for identifying machines at a site, the system comprising:
    a plurality of connectivity modules, each connectivity module communicatively and physically coupled to one of the machines, wherein each connectivity module is a self-contained unit comprising a beacon, the beacon comprising a light generator and a sound generator, wherein the beacon is configured to identify the associated machine by generating one or both of a first audible signal or a first visual signal; and
    a user device configured to:
        communicate with the connectivity modules via a network connection;
        receive, via a GUI, a user selection of a filter corresponding to a status or condition on an application hosted on the user device; and
        in response to receiving the user selection:
            identify a subset of the machines based on the selected filter, the subset comprising two or more machines;
            send a message instructing each machine in the subset to generate one or both of the first audible signal or the first visual signal; and
            send a message instructing one or more of the machines that are not included in the subset to generate one or both of a second visual signal or a second audible signal,
    wherein the second visual signal is different from the first visual signal, and wherein the second audible signal is different from the first audible signal.

2. The equipment identification system of claim 1, wherein the status or condition comprises one or more of a fuel level or a battery level.

3. The equipment identification system of claim 1, wherein the status or condition comprises one or more of a fuel level, a battery level, an ignition on/off condition, or a condition of movement.

4. The equipment identification system of claim 1, wherein the user device is configured to selectively command the beacons of one or more of the machines within a selected range of the user device to indicate a second status or condition of the associated machine.

5. The equipment identification system of claim 1, wherein the user device is configured to send a command to the connectivity module of a selected machine to power up or power down the selected machine.

6. The equipment identification system of claim 1, wherein the user device is configured to send a command to the connectivity module of a selected machine that enables or disables operation of the selected machine.

7. The equipment identification system of claim 1, wherein the connectivity modules are each communicatively coupled to a horn of a respective machine and wherein the connectivity module is configured to instruct the horn to generate the first audible signal.

8. The equipment identification system of claim 1, wherein the connectivity modules are each communicatively coupled to one or more lights of a respective machine and wherein the connectivity module is configured to instruct the one or more lights to generate the first visual signal.

9. An equipment identification system comprising:
    one or more processing circuits comprising one or more memory devices coupled to one or more processors, the one or more memory devices configured to store instructions thereon that, when executed by the one or more processors, cause the one or more processors to:

generate a graphical user interface (GUI) comprising a map including locations of a plurality of machines;
send the GUI to a screen of a user device;
receive, via the GUI, a selection of a filter corresponding to a status or condition;
identify a subset of the plurality of machines based on the selected filter, the subset comprising two or more machines;
send a message instructing each machine in the subset to generate one or both of a first visual indication or a first audible indication; and
send a message instructing one of the machines that is not included in the subset to generate one or both of a second visual indication or a second audible indication,
wherein the second visual indication is different from the first visual indication, and wherein the second audible indication is different from the first audible indication.

10. The equipment identification system of claim 9, wherein the status or condition comprises one or more of a fuel level, a battery level, an ignition on/off condition, or a condition of movement.

11. The equipment identification system of claim 9, wherein the instructions further cause the one or more processors to:
receive, via the GUI, an indication of a selection of an option to power up or power down a selected machine; and
send, (i) in response to receiving the indication of the selection of the option to power up the selected machine, a message instructing to the selected machine to power up the selected machine or, (ii) in response to receiving the indication of the selection of the option to power down the selected machine, a message instructing to the selected machine to power down the selected machine.

12. The equipment identification system of claim 9, wherein the instructions further cause the one or more processors to:
receive, via the GUI, an indication of a selection of an option to enable or disable operation of a selected machine; and
send, (i) in response to receiving the indication of the selection of the option to enable operation of the selected machine, a message instructing the selected machine to enable operation of the selected machine or, (ii) in response to receiving the indication of the selection of the option to disable operation of the selected machine, a message instructing to the selected machine to disable operation of the selected machine.

13. A machine identification method comprising:
generating a graphical user interface (GUI) comprising a map including locations of a plurality of machines;
sending the GUI to a screen of a user device;
receiving, via the GUI, a selection of a filter corresponding to a status or condition;
identifying a subset of the plurality of machines based on the selected filter, the subset comprising two or more machines;
sending a message instructing each machine in the subset to generate one or both of a first visual indication or a first audible indication; and
sending a message instructing one or more of the machines that are not included in the subset to generate one or both of a second visual indication or a second audible indication,
wherein the second visual indication is different from the first visual indication, and wherein the second audible indication is different from the first audible indication.

14. The machine identification method of claim 13, wherein the status or condition comprises one or more of a fuel level, a battery level, an ignition on/off condition, or a condition of movement.

15. The machine identification method of claim 13, further comprising:
receiving, via the GUI, an indication of a selection of an option to power up or power down a selected machine of the plurality of machines; and
sending, (i) in response to receiving the indication of the selection of the option to power up the selected machine, a message instructing to the selected machine to power up the selected machine or, (ii) in response to receiving the indication of the selection of the option to power down the selected machine, a message instructing to the selected machine to power down the machine.

16. The machine identification method of claim 13, further comprising:
receiving, via the GUI, an indication of a selection of an option to enable or disable operation of a selected machine of the plurality of machines; and
sending, (i) in response to receiving the indication of the selection of the option to enable operation of the selected machine, an instruction to the selected machine to enable operation of the selected machine or, (ii) in response to receiving the indication of the selection of the option to disable operation of the selected machine, an instruction to the selected machine to disable operation of the selected machine.

* * * * *